(12) United States Patent
Seo et al.

(10) Patent No.: US 12,455,713 B2
(45) Date of Patent: Oct. 28, 2025

(54) DISPLAY APPARATUS

(71) Applicant: LG DISPLAY CO., LTD., Seoul (KR)

(72) Inventors: Daeyoung Seo, Seoul (KR); Jongsung Kim, Seoul (KR); Yongmin Ha, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/405,517

(22) Filed: Jan. 5, 2024

(65) Prior Publication Data

US 2024/0256206 A1    Aug. 1, 2024

(30) Foreign Application Priority Data

Jan. 30, 2023   (KR) .................. 10-2023-0012185

(51) Int. Cl.
  *G06F 3/14*   (2006.01)
(52) U.S. Cl.
  CPC ................. *G06F 3/1446* (2013.01)
(58) Field of Classification Search
  CPC .................................................. G06F 3/1446
  See application file for complete search history.

(56) References Cited

U.S. PATENT DOCUMENTS

| | | | |
|---|---|---|---|
| 2016/0132281 A1* | 5/2016 | Yamazaki | G06F 3/0446 |
| | | | 345/1.3 |
| 2019/0086669 A1* | 3/2019 | Percival | G06F 3/012 |
| 2020/0203382 A1* | 6/2020 | Jung | H01L 25/18 |
| 2023/0154370 A1* | 5/2023 | Hsu | G06F 3/1446 |
| | | | 345/204 |

FOREIGN PATENT DOCUMENTS

| | | |
|---|---|---|
| KR | 10-2015-0111808 A | 10/2015 |
| KR | 10-2017-0080962 A | 7/2017 |

* cited by examiner

*Primary Examiner* — Matthew A Eason
(74) *Attorney, Agent, or Firm* — Fish & Richardson P.C.

(57) ABSTRACT

A display apparatus includes a first group including a plurality of first panels, a second group including plurality of second panels stacked on the first group, and a circuit film disposed at one portion of the first group and configured to apply a line signal to the first group. The first group and the second group are stacked on each other to be not aligned with each other. The first group and the second group are electrically connected to each other so that the line signal passes through the first group and the second group.

31 Claims, 17 Drawing Sheets

DISPLAY APPARATUS

CROSS-REFERENCE TO RELATED APPLICATION

This application claims the priority of Korean Patent Application No. 10-2023-0012185 filed on Jan. 30, 2023, which is hereby incorporated by reference in its entirety.

BACKGROUND

Field of the Disclosure

The present disclosure relates to a display apparatus, and more particularly, to a display apparatus in which a plurality of panel units are combined with each other.

Description of the Background

Display apparatuses are implemented in very diverse forms such as televisions, monitors, smart phones, tablet PCs, laptops, and wearable devices.

Among display apparatuses, a light-emitting type display apparatus has a light-emitting element or light source built therein, and may display information using light generated from the built-in light-emitting element or light source.

A display apparatus including a self-light-emitting element may be implemented to be thinner than a display apparatus having a light source built therein, and may be flexible, folded, bent, or rolled.

The display apparatus having the self-light-emitting element may include, for example, an organic light-emitting display apparatus (OLED; Organic Light-Emitting Diode Display) including a light-emitting layer including an organic material, or a micro-LED display apparatus (Micro LED; Micro Light-Emitting Diode Display), etc. including a light-emitting layer made of an inorganic material.

The micro-LED display apparatus includes the light-emitting layer including the inorganic material that is resistant to moisture and oxygen, and thus has excellent reliability and a long lifespan compared to the display apparatus including a light-emitting layer including an organic material.

Further, a micro-LED element of the micro-LED display apparatus not only lights up quickly, but also consumes smaller power and displays a high-luminance image. Thus, the micro-LED display apparatus is advantageously applied to an extra-large screen.

SUMMARY

As one of schemes to implement a display apparatus with a large display area size, there may be a tiling scheme of connecting a plurality of display panels with each other in a tiling manner to enlarge a display area size. The apparatus obtained in this manner may be referred to as a tiling display apparatus.

In the tiling display apparatuses, a separate structure may be needed to electrically connect the plurality of display panels to each other. For example, various lines that may be electrically connected to the plurality of display panels may be disposed in the separate structure.

However, when the display apparatus needs to be enlarged, a size of the separate structure should be large to correspond to an overall size of the display apparatus to be designed.

In particular, to manufacture not only a large display apparatus, but also a small display apparatus or a display apparatus with various shapes, the size and shape of the separate structure should be diversified to correspond to the size and shape of the display apparatus to be designed.

Accordingly, the present disclosure is to provide a display apparatus that substantially achieves the desires described above.

Accordingly, the present disclosure is to provide a display apparatus that may freely and easily cope with change in the size or shape of the tiling display apparatus.

The present disclosure is also to provide a tiling display apparatus without restrictions on production of a separate large line panel.

The present disclosure is also to provide a tiling display apparatus that may be manufactured by display panel units of a same type.

The present disclosure is also to provide a tiling display apparatus that may freely and easily cope with change in the size or shape of a display screen.

The present disclosure is also to provide a tiling display apparatus that may reduce a difference between light-emission from a light-emitting area and light-emission from a transmissive area and may increase luminance of a display apparatus.

Additional features and aspects will be set forth in the description that follows, and in part will be apparent from the description, or may be learned by practice of the inventive concepts provided herein. Other advantages of the present disclosure will be realized and attained by the structure particularly pointed out in the written description and claims hereof as well as the appended drawings.

To achieve these and other advantages and in accordance with the present disclosure, as embodied and broadly described, a display apparatus comprises a first group including a plurality of first panels, a second group including a plurality of second panels stacked on the first group, and a circuit film disposed at one portion of the first group and configured to apply a line signal to the first group. The first group and the second group are stacked on each other to be not aligned with each other. The first group and the second group are electrically connected to each other so that the line signal passes through the first group and the second group.

In another aspect of the present disclosure, a display apparatus comprises a first group including at least one first panel, a second group including at least one second panel on the first group, and a circuit film disposed at one portion of the first group and configured to apply a line signal to the first group. The first group and the second group are electrically connected to each other so that the line signal passes through the first panels and the second panels alternately.

In another aspect of the present disclosure, a display apparatus comprises a plurality of first groups spaced apart from each other, the plurality of first groups including at least one first panel, a second group stacked on the first groups, the second group including at least one second panel, and a circuit film disposed at one portion of one of the first groups and configured to apply a line signal to the one of the first panels. Adjacent ones of the plurality of first groups are electrically connected to each other by the second group so that the line signal passes through the at least one first panel and the at least one second panel alternately.

In a further aspect of the present disclosure, a display apparatus comprises a first group including a plurality of first panels, a second panel stacked on the first group, a circuit film disposed at one portion of the first group and configured to apply a line signal to the first group, and a contact member disposed between the first group and the second panel, and disposed to overlap a boundary part between adjacent ones of the plurality of first panels. The adjacent ones of the plurality of first panels are electrically connected to each other by the contact member such that the line signal passes through the adjacent ones of the plurality of first panels.

According to a display apparatus according to an aspect of the present disclosure, a first group and a second group are stacked so that they are not aligned with each other in the plan view. Thus, a structure that first panels and second panels are electrically connected to each other by an electrical vertical connection structure between the first panel and the second panel as a contact member such that a line signal may alternately pass through the first panels and the second panels by the contact members may be easily designed.

Furthermore, according to the display apparatus according to an aspect of the present disclosure, each of a first panel and a second panel may be embodied as a single display panel of a same type. Thus, the display apparatus may be manufactured simply by arranging the display panels in a tiling manner without a separate line panel.

Accordingly, even when a large-sized tiling display apparatus is to be manufactured, there is no need to manufacture a separate large panel, so that process optimization due to high process efficiency may be achieved.

Furthermore, display screens of various sizes and shapes may be freely and easily implemented by a vertical stack structure of identical display panel parts of the same type.

In addition, a first pixel of a first panel and a second pixel of the second panel may be positioned so as not to overlap each other in the vertical direction. Because the first pixel of the first panel and the second pixel of the second panel are positioned so as not to overlap each other in the vertical direction, the display apparatus according to an aspect of the present disclosure may have a more dense and compact pixel arrangement structure, and thus may be advantageous in implementing a display apparatus having a high-resolution.

Furthermore, the display apparatus according to an aspect of the present disclosure may be used to freely implement each of the display apparatuses having screens of various sizes and shapes via change in the number and the arrangement of the combined display panel units.

For example, because the number of display panel units may be freely increased, the display apparatus according to an aspect of the present disclosure may be able to more easily implement a large-sized screen. Furthermore, the non-display area of the display apparatus according to an aspect of the present disclosure may be minimized.

For example, the display apparatus according to an aspect of the present disclosure may be configured such that a spacing between the outermost light-emitting element of one display panel and the outermost light-emitting element of another display panel adjacent thereto may be equal to a spacing between adjacent light-emitting elements in one display panel. Accordingly, the display apparatus according to an aspect of the present disclosure may minimize a non-display area, and furthermore, may be implemented as a zero-bezel display apparatus with substantially no bezel area.

Furthermore, a pixel disposed in a first panel as a display panel and a pixel disposed in a second panel as a display panel are positioned such that at least partial areas thereof overlap each other, thereby reducing a difference between light-emission from a light-emitting area and light-emission from a transmissive area and increasing luminance. Thus, the device apparatus may operate at a low power consumption.

Furthermore, when a first panel is embodied as a display panel and a second panel is embodied as a line panel, a plurality of line panel units may be arranged in a tiling scheme, thereby manufacturing display apparatuses of various sizes without limitations on production of a panel having a large line panel.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with aspects of the disclosure.

It is to be understood that both the foregoing description and the following description of the present disclosure are exemplary and explanatory and are intended to provide further explanation of the disclosure inventive concepts as claimed.

BRIEF DESCRIPTION OF THE DRAWINGS

The accompanying drawings, which are included to provide a further understanding of the disclosure and are incorporated in and constitute a part of the present disclosure, illustrate various aspects of the disclosure and together with the description serve to explain principles of the disclosure.

In the drawings.

Figure 1:
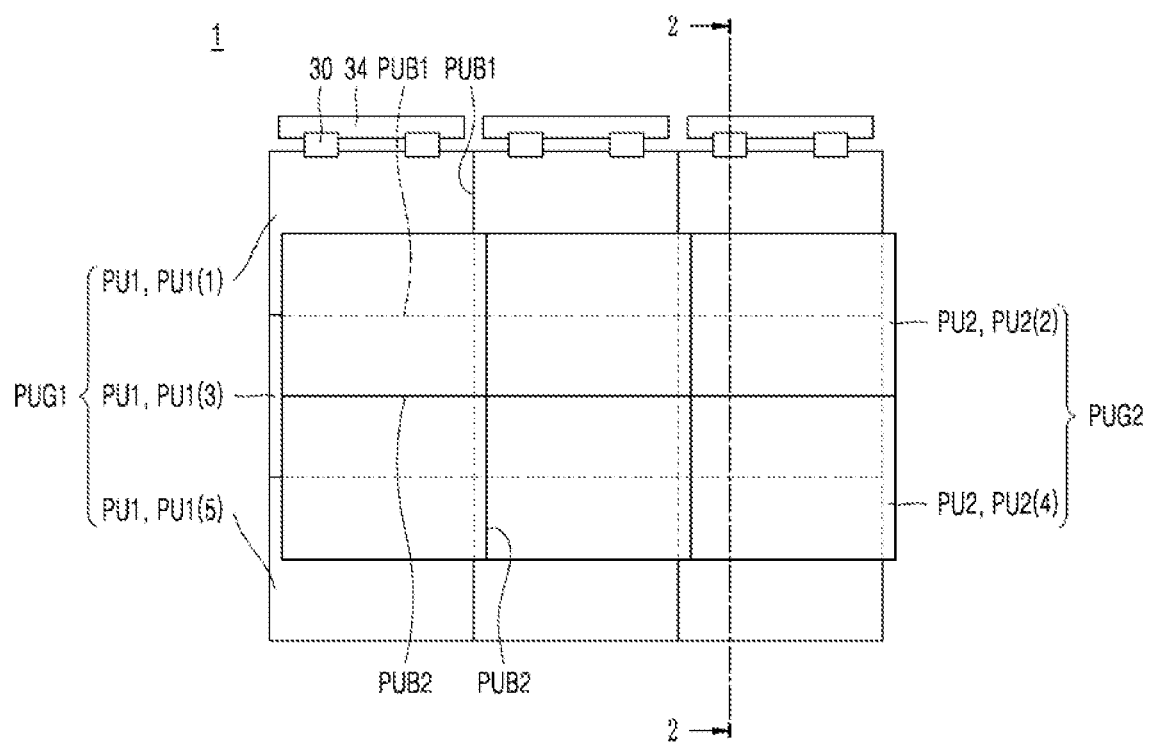
FIG. 1 is a plan view showing a stacked structure of a display apparatus according to a first aspect of the present disclosure.

Throughout the drawings and the detailed description, unless otherwise described, the same drawing reference numerals should be understood to refer to the same elements, features, and structures. The sizes, lengths, and thicknesses of layers, regions and elements, and depiction of thereof may be exaggerated for clarity, illustration, and/or convenience.

DETAILED DESCRIPTION

Reference is now made in detail to aspects of the present disclosure, examples of which may be illustrated in the accompanying drawings. In the following description, when a detailed description of well-known functions, structures or configurations may unnecessarily obscure aspects of the present disclosure, the detailed description thereof may have been omitted for brevity. Further, repetitive descriptions may be omitted for brevity. The progression of processing steps and/or operations described is a non-limiting example.

The sequence of steps and/or operations is not limited to that set forth herein and may be changed to occur in an order that is different from an order described herein, with the exception of steps and/or operations necessarily occurring in a particular order. In one or more examples, two operations in succession may be performed substantially concurrently, or the two operations may be performed in a reverse order or in a different order depending on a function or operation involved.

Unless stated otherwise, like reference numerals may refer to like elements throughout even when they are shown in different drawings. In one or more aspects, identical elements (or elements with identical names) in different drawings may have the same or substantially the same functions and properties unless stated otherwise. Names of the respective elements used in the following explanations are selected only for convenience and may be thus different from those used in actual products.

Advantages and features of the present disclosure, and implementation methods thereof, are clarified through the aspects described with reference to the accompanying drawings. The present disclosure may, however, be embodied in different forms and should not be construed as limited to the aspects set forth herein. Rather, these aspects are examples and are provided so that this disclosure may be thorough and complete, to assist those skill in the art to understand the inventive concepts without limiting the protected scope of the present disclosure.

Shapes (e.g., sizes, lengths, widths, heights, thicknesses, locations, radii, diameters, and areas), angles, numbers, and the like disclosed herein, including those illustrated in the drawings are merely examples, and thus, the present disclosure is not limited to the illustrated details. Any implementation described herein as an "example" is not necessarily to be construed as preferred or advantageous over other implementations. It is, however, noted that the relative dimensions of the components illustrated in the drawings are part of the present disclosure.

It will When the term "comprise," "have," "include," "contain," "constitute," "made up of," "formed of," or the like is used with respect to one or more elements, one or more other elements may be added unless a term such as "only" or the like is used. The terms used in the present disclosure are merely used to describe example aspects, and are not intended to limit the scope of the present disclosure. The terms of a singular form may include plural forms unless the context clearly indicates otherwise.

The word "exemplary" is used to mean serving as an example or illustration. Aspects are example aspects. "Aspects," "examples," "aspects," and the like should not be construed as preferred or advantageous over other implementations. An aspect, an example, an example aspect, an aspect, or the like may refer to one or more aspects, one or more examples, one or more example aspects, one or more aspects, or the like, unless stated otherwise. Further, the term "may" encompass all the meanings of the term "can."

In one or more aspects, unless explicitly stated otherwise, an element, feature, or corresponding information (e.g., a level, range, dimension, size, or the like) is construed to include an error or tolerance range even where no explicit description of such an error or tolerance range is provided. An error or tolerance range may be caused by various factors (e.g., process factors, internal or external impact, noise, or the like). In interpreting a numerical value, the value is interpreted as including an error range unless explicitly stated otherwise.

In describing a positional relationship, where the positional relationship between two parts (e.g., layers, films, regions, components, sections, or the like) is described, for example, using "on," "upon," "on top of," "over," "under," "above," "below," "beneath," "near," "close to," "adjacent to," "beside," "next to," "at or on a side of," or the like, one or more parts may be located between two other parts unless a more limiting term, such as "immediate(ly)," "direct(ly)," or "close(ly)," is used. For example, when a structure is described as being positioned "on," "on a top of," "upon," "on top of," "over," "under," "above," "below," "beneath," "near," "close to," "adjacent to," "beside," or "next to," "at or on a side of," or the like another structure, this description should be construed as including a case in which the structures contact each other as well as a case in which one or more additional structures are disposed or interposed therebetween. Furthermore, the terms "front," "rear," "back," "left," "right," "top," "bottom," "downward," "upward," "upper," "lower," "up," "down," "column," "row," "vertical," "horizontal," and the like refer to an arbitrary frame of reference.

Spatially relative terms, such as "below," "beneath," "lower," "on," "above," "upper" and the like, may be used to describe a correlation between various elements (e.g., layers, films, regions, components, sections, or the like) as shown in the drawings. The spatially relative terms are to be understood as terms including different orientations of the elements in use or in operation in addition to the orientation depicted in the drawings. For example, if the elements shown in the drawings are turned over, elements described as "below" or "beneath" other elements would be oriented "above" other elements. Thus, the term "below," which is an example term, may include both directions of "above" and "below." Likewise, an exemplary term "above" or "on" may include both directions of "above" and "below."

In describing a temporal relationship, when the temporal order is described as "after," "subsequent," "next," "before," "preceding," "prior to," or the like a case which is not consecutive or not sequential may be included and thus one or more other events may occur therebetween, unless a more limiting term, such as "just," "immediate(ly)," or "direct(ly)" is used.

The terms, such as "below," "lower," "above," "upper" and the like, may be used herein to describe a relationship between element(s) as illustrated in the drawings. It will be understood that the terms are spatially relative and based on the orientation depicted in the drawings.

It is understood that, although the terms "first," "second," or the like may be used herein to describe various elements (e.g., layers, films, regions, components, sections, or the like), these elements should not be limited by these terms. These terms are used only to partition one element from another. For example, a first element could be a second element, and, similarly, a second element could be a first element, without departing from the scope of the present disclosure. Furthermore, the first element, the second element, and the like may be arbitrarily named according to the convenience of those skilled in the art without departing from the scope of the present disclosure. For clarity, the functions or structures of these elements (e.g., the first element, the second element and the like) are not limited by ordinal numbers or the names in front of the elements. Further, a first element may include one or more first elements. Similarly, a second element or the like may include one or more second elements or the like.

In describing elements of the present disclosure, the terms "first," "second," "A," "B," "(a)," "(b)," or the like may be used. These terms are intended to identify the corresponding element(s) from the other element(s), and these are not used to define the essence, basis, order, or number of the elements.

For the expression that an element (e.g., layer, film, region, component, section, or the like) is "connected," "coupled," "attached," "adhered," or the like to another element, the element may not only be directly connected, coupled, attached, adhered, or the like to another element, but also be indirectly connected, coupled, attached, adhered, or the like to another element with one or more intervening elements disposed or interposed between the elements, unless otherwise specified.

For the expression that an element (e.g., layer, film, region, component, section, or the like) "contacts," "overlaps," or the like with another element, the element may not only directly contact, overlap, or the like with another element, but also indirectly contact, overlap, or the like with another element with one or more intervening elements disposed or interposed between the elements, unless otherwise specified.

The phase that an element (e.g., layer, film, region, component, section, or the like) is "provided in," "disposed in," or the like in another element may be understood as that at least a portion of the element is provided in, disposed in, or the like in another element, or that the entirety of the element is provided in, disposed in, or the like in another element. The phase that an element (e.g., layer, film, region, component, section, or the like) "contacts," "overlaps," or the like with another element may be understood as that at least a portion of the element contacts, overlaps, or the like with a least a portion of another element, that the entirety of the element contacts, overlaps, or the like with a least a portion of another element, or that at least a portion of the element contacts, overlaps, or the like with the entirety of another element.

The terms such as a "line" or "direction" should not be interpreted only based on a geometrical relationship in which the respective lines or directions are parallel or perpendicular to each other, and may be meant as lines or directions having wider directivities within the range within which the components of the present disclosure may operate functionally. For example, the terms "first direction," "second direction," and the like, such as a direction parallel or perpendicular to "x-axis," "y-axis," or "z-axis," should not be interpreted only based on a geometrical relationship in which the respective directions are parallel or perpendicular to each other, and may be meant as directions having wider directivities within the range within which the components of the present disclosure may operate functionally.

The term "at least one" should be understood as including any and all combinations of one or more of the associated listed items. For example, each of the phrases of "at least one of a first item, a second item, or a third item" and "at least one of a first item, a second item, and a third item" may represent (i) a combination of items provided by two or more of the first item, the second item, and the third item or (ii) only one of the first item, the second item, or the third item.

The expression of a first element, a second elements "and/or" a third element should be understood as one of the first, second and third elements or as any or all combinations of the first, second and third elements. By way of example, A, B and/or C may refer to only A; only B; only C; any of A, B, and C (e.g., A, B, or C); or some combination of A, B, and C (e.g., A and B; A and C; or B and C); or all of A, B, and C. Furthermore, an expression "A/B" may be understood as A and/or B. For example, an expression "A/B" may refer to only A; only B; A or B; or A and B.

In one or more aspects, the terms "between" and "among" may be used interchangeably simply for convenience unless stated otherwise. For example, an expression "between a plurality of elements" may be understood as among a plurality of elements. In another example, an expression "among a plurality of elements" may be understood as between a plurality of elements. In one or more examples, the number of elements may be two. In one or more examples, the number of elements may be more than two. Furthermore, when an element (e.g., layer, film, region, component, sections, or the like) is referred to as being "between" at least two elements, the element may be the only element between the at least two elements, or one or more intervening elements may also be present.

In one or more aspects, the phrases "each other" and "one another" may be used interchangeably simply for convenience unless stated otherwise. For example, an expression "different from each other" may be understood as being different from one another. In another example, an expression "different from one another" may be understood as being different from each other. In one or more examples, the number of elements involved in the foregoing expression may be two. In one or more examples, the number of elements involved in the foregoing expression may be more than two.

In one or more aspects, the phrases "one or more among" and "one or more of" may be used interchangeably simply for convenience unless stated otherwise.

The term "or" means "inclusive or" rather than "exclusive or." That is, unless otherwise stated or clear from the context, the expression that "x uses a or b" means any one of natural inclusive permutations. For example, "a or b" may mean "a," "b," or "a and b." For example, "a, b or c" may mean "a," "b," "c," "a and b," "b and c," "a and c," or "a, b and c."

Features of various aspects of the present disclosure may be partially or entirety coupled to or combined with each other, may be technically associated with each other, and may be variously inter-operated, linked or driven together. The aspects of the present disclosure may be implemented or carried out independently of each other, or may be implemented or carried out together in a co-dependent or related relationship. In one or more aspects, the components of each apparatus according to various aspects of the present disclosure are operatively coupled and configured.

Unless otherwise defined, all terms (including technical and scientific terms) used herein have the same meaning as commonly understood by one of ordinary skill in the art to example aspects belong. It is further understood that terms, such as those defined in commonly used dictionaries, should be interpreted as having a meaning that is, for example, consistent with their meaning in the context of the relevant art and should not be interpreted in an idealized or overly formal sense unless expressly defined otherwise herein.

The terms used in the description below have been selected as being general and universal in the related technical field. However, there may be other terms than the terms depending on the development and/or change of technology, convention, preference of technicians, etc. Therefore, the terms used in the description below should not be understood as limiting technical ideas, but should be understood as examples of the terms for illustrating aspects.

Further, in a specific case, a term may be arbitrarily selected by the applicant, and in this case, the detailed meaning thereof will be described in a corresponding description herein. Therefore, the terms used herein should be understood based on not only the name of the terms, but also the meaning of the terms and the content hereof.

Figure 2:
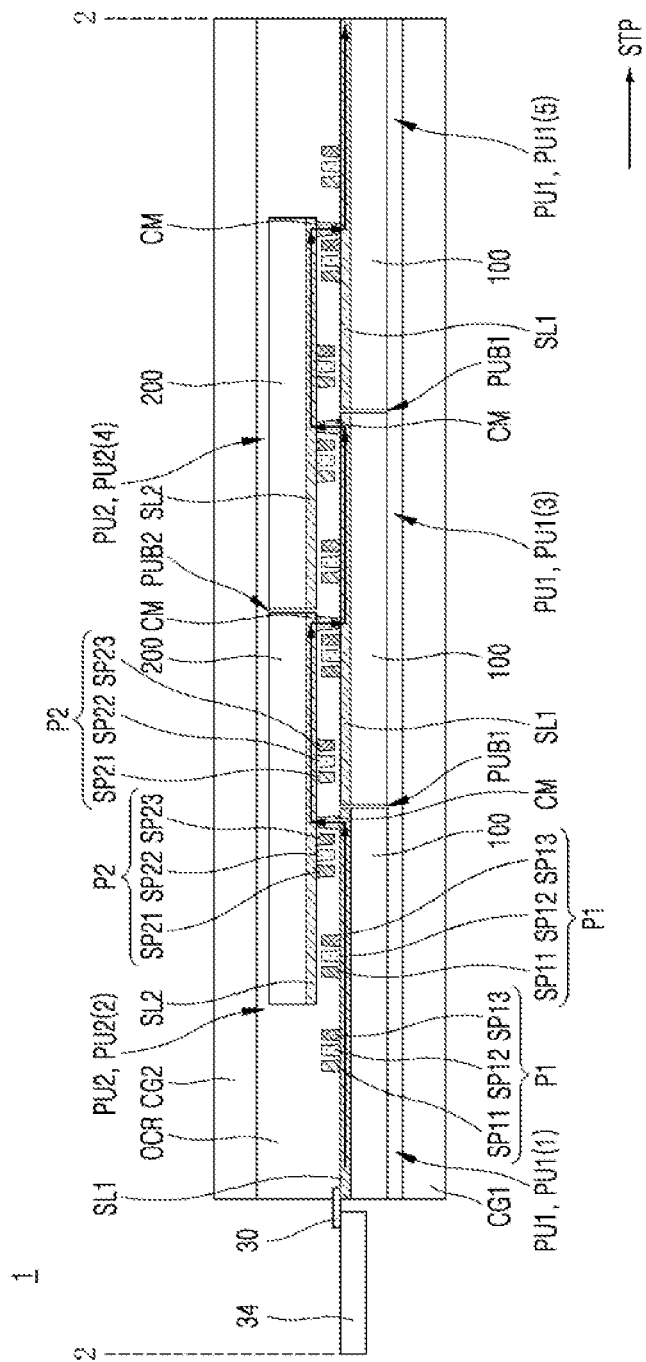
FIG. 2 is a cross-sectional view showing flow of a line signal of the display apparatus according to the first aspect of the present disclosure.
Figure 3:
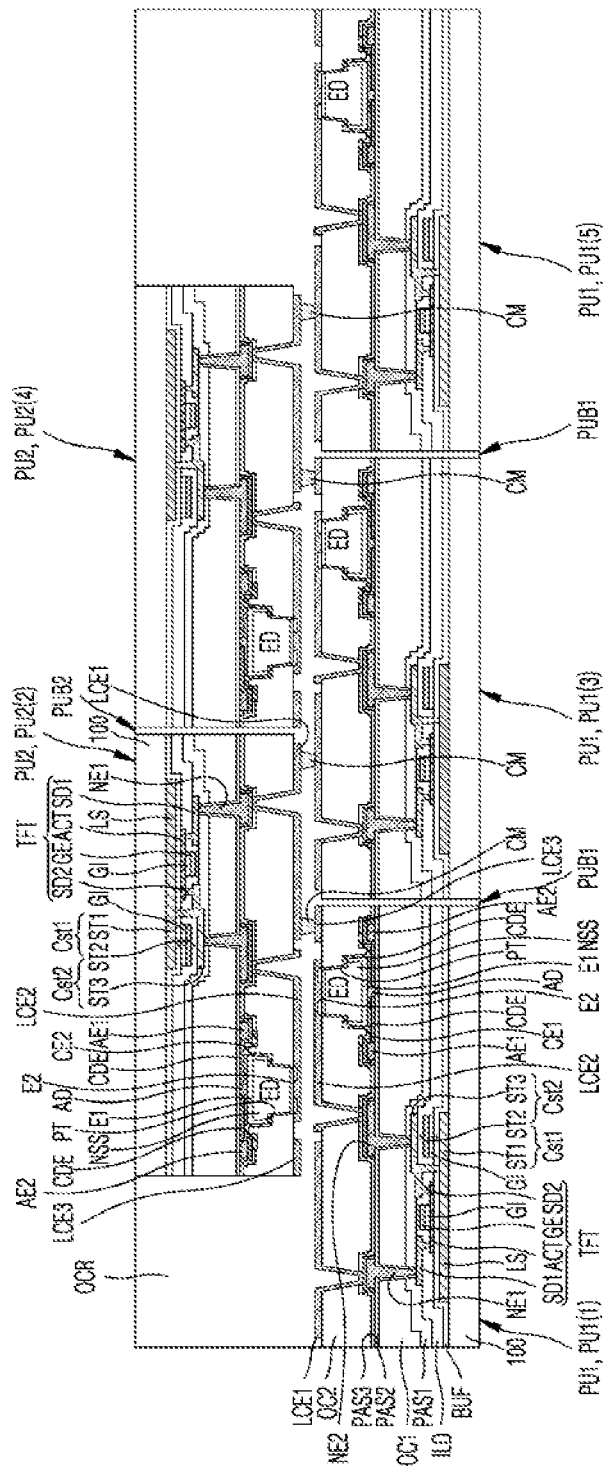
FIG. 3 is a detailed cross-sectional view of the display apparatus according to the first aspect of the present disclosure.

Hereinafter, with reference to FIG. 1 to FIG. 3, a display apparatus according to a first aspect of the present disclosure will be described in detail.

Referring to FIG. 1, one first group PUG1 may include a plurality of first panels PU1 sequentially arranged in a first direction and/or a second direction. The first direction as used herein may be a column direction, and the second direction may be a row direction.

However, aspects of the present disclosure are not limited thereto, for example, the first group PUG1 may be composed of one first panel PU1.

The plurality of first panels PU1 may be arranged in a tiling scheme and may be positioned individually at predetermined positions.

The plurality of first panels PU1 may be arranged consecutively, and may be disposed to be spaced apart from each other with a predetermined distance.

In this case, an interval (or a spacing or a distance) between adjacent ones of the plurality of first panels PU1 may be constant. However, aspects of the present disclosure are not limited thereto, and the interval may vary (or different) depending on a size or a shape of a display screen to be implemented.

Ones adjacent to each other of the plurality of first panels PU1 may not be electrically connected to each other without a separate contact member.

However, aspects of the present disclosure are not limited thereto, and the plurality of first panels PU1 may be arranged continuously without an interval (or a space) between adjacent ones thereof, or ones adjacent to each other of the plurality of first panels PU1 may be electrically connected to each other.

FIG. 1 illustrates one example in which the first panels PU1 are arranged in 3 rows and 3 columns. However, aspects of the present disclosure are not limited thereto.

For convenience of description, the plurality of first panels PU1 arranged in the first direction may be referred to as a first panel PU1($2n-1$). In this case, n is a natural number. Therefore, the first panels PU1 arranged in the first direction shown in FIG. 1 may include a first panel PU1(1), a first panel PU1(3), and a first panel PU1(5).

Each of the plurality of first panels PU1 may be a same single panel having one type. Therefore, the plurality of first panels PU1 may be a same panel having a same size and shape.

The first panel PU1 may be a first display panel. Therefore, the first panel PU1 may include a plurality of first pixel parts P1 arranged on a first substrate 100, and a plurality of first signal lines SL1 that apply various line signals to the plurality of first pixel parts P1.

The first substrate 100 may be an insulating substrate, for example, may be formed of glass or transparent plastic material to implement a transparent display apparatus.

Each of the plurality of first pixel parts P1 may include a first sub-pixel SP11 emitting light of a first color, a first sub-pixel SP12 emitting light of a second color, and a first sub-pixel SP13 emitting light of a third color.

For example, the first sub-pixel SP11 emitting light of the first color, the first sub-pixel SP12 emitting light of the second color, and the first sub-pixel SP13 emitting light of the third color may be respectively a red sub-pixel emitting light of red (R), a green sub-pixel emitting light of green (G), and a blue sub-pixel emitting light of blue (B). However, aspects of the present disclosure are not limited thereto.

For example, each of the plurality of first pixel parts P1 may further include a white sub-pixel that emits light of white (W).

Each of the first sub-pixels SP11, SP12, and SP13 may include a light-emitting area and a circuit area.

A light-emitting element ED may be disposed at or in the light-emitting area. Therefore, a plurality of light-emitting elements ED may be disposed at or in the first pixel part P1 of the first panel PU1.

The present disclosure describes an example in which the light-emitting element ED is embodied as a micro-LED. However, aspects of the present disclosure are not limited thereto.

The plurality of first sub-pixels SP11, SP12, and SP13 of the first panel PU1 may include a light-emitting element ED emitting light of a first color, a light-emitting element ED emitting light of a second color, and a light-emitting element ED emitting light of a third color, respectively.

The circuit area may be a remaining area other than the light-emitting area. A driving circuit including a thin-film transistor TFT and a storage capacitor Cst for driving the plurality of light-emitting elements ED may be disposed in the circuit area.

In one example, a light-transmissive area may be additionally disposed in each of the first sub-pixels SP11, SP12, and SP13, so that the display apparatus 1 may be embodied as a transparent display apparatus.

As previously described, the plurality of first signal line SL1 may be disposed in the first panel PU1.

The plurality of first signal lines SL1 may include a data signal line, a high-potential voltage (EVDD) signal line, a reference voltage signal line, a low-potential voltage (EVSS) signal line, and a scan signal line, etc.

The data signal line, the high-potential voltage signal line, the reference voltage signal line, and the low-potential voltage signal line may extend in a column direction, and the scan signal line may extend in a row direction to intersect the data signal line. Each of the plurality of first sub-pixels SP11, SP12, and SP13 may be disposed in an area where the data signal line extending in the column direction and the scan signal line extending in the row direction intersect. Accordingly, the plurality of first sub-pixels SP11, SP12, and SP13 may be arranged in a matrix form, and the light-emitting elements ED corresponding to the sub-pixel may be arranged in a matrix form.

A circuit film 30 that transmits various line signals to the display apparatus 1 may be disposed at or in one side (or one portion) of the first panel PU1 to be electrically connected to the first panel PU1.

The circuit film 30 may be electrically connected to the first signal line SL1 of the first panel PU1.

The circuit film 30 may be embodied as a flexible circuit film, and a data driver (D-IC) may be disposed on each circuit film 30 in a chip on film (COF) scheme. However, aspects of the present disclosure are not limited thereto.

One or more printed circuit boards 34 may be electrically connected to the other side (or the other portion) of the circuit film 30 opposite to one side of the circuit film 30 connected to the first panel PU1.

The printed circuit board 34 may be embodied as a flexible printed circuit board (FPCB). For example, the printed circuit board 34 may include a source printed circuit board and a control printed circuit board. In this case, the source printed circuit board and the control printed circuit board may be connected to each other using a flat flexible cable (FFC). However, aspects of the present disclosure are not limited thereto.

A power management circuit, a timing controller, a level shifter, and the like may be disposed in the printed circuit board 34.

The power management circuit may generate and output various operation voltages required for all circuit components of the display apparatus 1 by an input voltage supplied from an external source.

The timing controller may receive an image data and input timing control signals from an external host system, and then supply a plurality of data control signals and the image data to a data driver, and supply a plurality of gate control signals to a gate driver.

The data driver may receive the plurality of data control signals and the image data from the timing controller, convert the plurality of data control signals and the image data into a data signal, and supply a data voltage to a data signal line.

The gate driver may receive the plurality of gate control signals from the timing controller via a level shifter, convert the plurality of gate control signals into a gate signal (or scan signal), and supply a gate voltage (e.g., a scan voltage) to a gate signal line. For example, the gate driver may be mounted in the first panel PU1 in a gate-in-panel (GIP) scheme. However, aspects of the present disclosure are not limited thereto.

Various voltages and signals generated in this way may be transmitted to the first signal line SL1 of the first panel PU1 via the circuit film 30.

The plurality of first signal line SL1 may be positioned to be spaced apart from each other along one direction. Therefore, various voltages and signals transmitted through the circuit film 30 may be supplied to each of the first pixels P1 through the first signal line SL1.

One second group PUG2 may include a plurality of second panels PU2 sequentially arranged in the first direction and/or the second direction. However, aspects of the present disclosure are not limited thereto, for example, the second group PUG2 may be composed of one second panel PU2.

The plurality of second panels PU2 may be arranged in a tiling scheme and may be positioned individually at predetermined positions.

The plurality of second panels PU2 may be arranged consecutively, and may be disposed to be spaced from each other with a predetermined distance.

In this case, an interval (or distance or spacing) between adjacent ones of the plurality of second panels PU2 may be constant. However, aspects of the present disclosure are not limited thereto, and the interval may vary (or different) depending on a size or a shape of a display screen to be implemented.

Ones adjacent to each other of the plurality of second panels PU2 may not be electrically connected to each other without a separate contact member.

However, aspects of the present disclosure are not limited thereto, and the plurality of second panels PU2 may be arranged continuously without an interval between adjacent ones thereof, or ones adjacent to each other of the plurality of second panels PU2 may be electrically connected to each other.

FIG. 1 illustrates one example in which the second panels PU2 are arranged in 2 rows and 3 columns. However, aspects of the present disclosure are not limited thereto.

For convenience of description, the plurality of second panels PU2 arranged in the first direction may be referred to as a second panel PU2(2$n$). In this case, n is a natural number.

Therefore, the second panels PU2 arranged in the first direction shown in FIG. 1 may include a second panel PU2(2), and a second panel PU2(4).

The plurality of second panels PU2 may be a same single panel having one type. Therefore, the plurality of second panels PU2 may have the same size and shape.

The second panel PU2 may be a second display panel. Therefore, the second panel PU2 may include a plurality of second pixel parts P2 arranged on a second substrate 200, and a plurality of second signal lines SL2 that apply various line signals to the plurality of second pixel parts P2.

The second substrate 200 may be an insulating substrate, for example, may be formed of glass or transparent plastic material to implement a transparent display apparatus.

Each of the plurality of second pixel parts P2 may include a second sub-pixel SP21 emitting light of a first color, a second sub-pixel SP22 emitting light of a second color, and a second sub-pixel SP23 emitting light of a third color.

In this case, the second panel PU2 and the first panel PU1 may be the same panel unit having the same size and shape.

In other words, each of the first panel PU1 and the second panel PU2 may be a same single panel unit having one type.

However, in a plan view of the display apparatus, a position of the first panel PU1 and a position of the second panel PU2 may be different from each other and the first panel PU1 and the second panel PU2 are each composed of one display panel.

Accordingly, in accordance with the present disclosure, an arrangement structure of the light-emitting area, the circuit area, the light-transmissive areas and the second signal line SL2 that constitute the second panel PU2 including the second pixel part P2 is substantially the same as the arrangement structure of the light-emitting area, the circuit area, the light-transmissive areas and the first signal line SL1 that constitute the first panel PU1 including the first pixel part P1. Thus, hereinafter, repeated descriptions will be omitted.

The second group PUG2 may be stacked on the first group PUG1 so that the second group PUG2 is not aligned with the first group PUG1 in the plan view.

For example, the first group PUG1 and the second group PUG2 are stacked on each other such that a boundary part PUB1 between adjacent ones of the plurality of first panels PU1 and a boundary part PUB2 between adjacent ones of the plurality of second panels PU2 are not aligned with each other in the plan view.

For example, the boundary part PUB1 between adjacent ones of the plurality of first panels PU1 arranged along the first direction may extend along approximately a center area of the second panel PU2.

Furthermore, the boundary part PUB2 between adjacent ones of the plurality of second panels PU2 arranged along the first direction may extend along approximately a center area of the first panel PU1.

Therefore, with respect to the first direction, the first panel PU1 and the second panel PU2 may be disposed such that an approximately half area of one first panel PU1 overlaps an approximately half area of one second panel PU2.

For example, the boundary part PUB1 between adjacent ones of the plurality of first panels PU1 arranged along the second direction may extend along approximately a periphery of the second panel PU2.

Furthermore, the boundary part PUB2 between adjacent ones of the plurality of second panels PU2 arranged along the second direction may extend along approximately a periphery of the first panel PU1.

In this structure, a total number of the first panels PU1 disposed in the first group PUG1 may be greater than a total number of the second panels PU2 disposed in the second group PUG2.

Accordingly, in the plan view, the first panels PU1 and the second panels PU2 may be arranged in a zigzag manner along the first direction and/or the second direction, such that the first panels PU1 and the second panels PU2 stacked in a vertical direction (or up and down direction) may be arranged alternately with each other in the plan view.

For example, the first panel PU1(1) to which the circuit film 30 is connected, the second panel PU2(2), the first panel PU1(3), the second panel PU2(4), and the first panel PU1(5) may be arranged sequentially and alternately with each other in this order in a direction away from the circuit film 30.

The first group PUG1 and the second group PUG2 may be electrically connected to each other via (or through or by) one or more contact members CM disposed between the first panel PU1 and the second panel PU2.

For example, the first signal line SL1 of the first panel PU1 may be electrically connected to the second signal line SL2 of the second panel PU2 by the contact member CM.

The contact member CM may be formed of a conductive material. For example, the contact member CM may be formed of a metal, conductive ink, or conductive paste such as silver paste. However, aspects of the present disclosure are not limited thereto.

The plurality of contact members CM may be arranged according to a flow direction of a line signal STP, and the line signal STP may pass through the first panels PU1 and the second panels PU2 by the plurality of contact members CM in an alternate manner.

The flow directions of the line signal STP in neighboring ones of the plurality of contact members CM may be opposite to each other.

In this case, one first panel PU1 may be electrically connected to one second panel PU2 by one contact member CM.

For example, the line signal STP transmitted via the circuit film 30 may flow sequentially through the first panel PU1(1), the second panel PU2(2), the first panel PU1(3), the second panel PU2(4), and the first panel PU1(5) in this order.

Therefore, the first group PUG1 and the second group PUG2 may be electrically connected to each other so that the line signal STP alternately passes through the first panels PU1 and the second panels PU2.

Unlike the configuration of the present disclosure, the first group PUG1 and the second PUG2 may be disposed to be aligned with each other to entirely overlap each other in the vertical direction. In this case, in addition to an electrical vertical connection structure between the first panel PU1 and the second panel PU2 stacked in the vertical direction, an electrical horizontal connection structure between the first panels PU1 adjacent to each other or the second panels PU2 adjacent to each other may be required.

However, in the display apparatus 1 according to an aspect of the present disclosure, the first group PUG1 and the second group PUG2 are stacked so that they are not aligned with each other in the plan view. Thus, a structure that the first panels PU1 and the second panels PU2 are electrically connected to each other by the electrical vertical connection structure between the first panel PU1 and the second panel PU2 as the contact member CM such that the line signal STP may alternately pass through the first panels PU1 and the second panels PU2 via (or through or by) the contact members CM may be easily designed.

Furthermore, in the display apparatus 1 according to an aspect of the present disclosure, the first panel PU1 and the second panel PU2 may be embodied as the same display panel of one type. Thus, the display apparatus 1 may be manufactured simply by arranging the display panels in the tiling manner without a separate line panel.

Accordingly, even when a tiling display apparatus having a large size is to be manufactured, there is no need to manufacture a separate large line panel, so that process optimization due to high process efficiency may be achieved.

Furthermore, display screens of various sizes and shapes may be freely and easily implemented via a vertical stack structure of same display panel units of one type.

In addition, the first pixel part P1 of the first panel PU1 and the second pixel part P2 of the second panel PU2 may be positioned so as not to overlap each other in the vertical direction.

Because the first pixel part P1 of the first panel PU1 and the second pixel part P2 of the second panel PU2 are positioned so as not to overlap each other in the vertical direction, the display apparatus 1 according to an aspect of the present disclosure may have a more dense and compact pixel arrangement structure, and thus may be advantageous in implementing a high-resolution display apparatus.

Furthermore, the display apparatus 1 according to an aspect of the present disclosure may be used to freely implement each of the display apparatuses 1 having screens of various sizes and shapes by changing the number and the arrangement of the combined display panels.

For example, because the number of display panels (or display panel units) may be freely increased, the display apparatus 1 according to an aspect of the present disclosure may be able to more easily implement a large-sized screen.

Furthermore, the non-display area of the display apparatus 1 according to an aspect of the present disclosure may be minimized.

For example, the display apparatus 1 according to an aspect of the present disclosure may be configured such that a distance (or a spacing) between the outermost light-emitting element of one display panel and the outermost light-emitting element of another adjacent display panel adjacent thereto may be equal to a distance (or a spacing) between adjacent light-emitting elements in one display panel.

Accordingly, the display apparatus 1 according to an aspect of the present disclosure may minimize the non-display area, and furthermore, may be implemented as a zero-bezel display apparatus with substantially no bezel area.

The first group PUG1 and the second group PUG2 may be bonded to each other by an optical resin layer OCR disposed between the first group PUG1 and the second group PUG2.

For example, the optical resin layer OCR may include an optically cleared resin (OCR).

The optical resin layer OCR may be disposed to fill a distance (or a space) between the first group PUG1 and the second group PUG2, a distance (or a space) between adjacent ones of the plurality of first panels PU1, and a distance (or a space) between adjacent ones of the plurality of second panels PU2.

A first cover part CG1 and a second cover part CG2 may be further disposed at a lower surface of the first group PUG1 and an upper surface of the second group PUG2, respectively.

For example, each of the first cover part CG1 and the second cover part CG2 may be embodied as a single glass substrate, and may be formed to surround an outer side of each of the first group PUG1 and the second group PUG2, and thus may constitute an outer surface of the display apparatus 1.

The optical resin layer OCR may be disposed to fill a distance (or a space) between the first group PUG1 and the first cover part CG1 and a distance (or a space) between the second group PUG2 and the second cover part CG2.

Hereinafter, referring to FIG. 3, a detailed stack structure and electrical connection structure between the first panel PU1 and the second panel PU2 in a state in which the first group PUG1 and the second group PUG2 have been bonded (or attached) to each other will be described in more detail.

The first panel PU1 may include the first substrate 100, and the thin-film transistor TFT, the storage capacitor Cst, and various lines disposed on the first substrate 100 The first substrate 100 may be referred to as a base substrate.

The base substrate 100 may be formed of a transparent material including glass or plastic.

A light-blocking layer LS may be disposed on the base substrate 100 to prevent light incident from a position under the base substrate 100 to an active layer ACT of the thin-film transistor TFT, such that leakage current may be reduced.

A buffer layer BUF may be disposed on the light-blocking layer LS to block impurities or moisture passing through the base substrate 100.

The thin-film transistor TFT may be disposed on the buffer layer BUF.

The thin-film transistor TFT may act as a driving thin-film transistor that provides a driving signal for driving the light-emitting element ED.

The thin-film transistor TFT may include an active layer ACT, a first source/drain electrode SD1, a second source/drain electrode SD2, and a gate electrode GE.

A gate insulating layer GI may be disposed between the active layer ACT and the gate electrode GE.

An interlayer insulating layer ILD may be disposed on the active layer ACT and the gate electrode GE. The interlayer insulating layer ILD may have a pair of contact-holes defined therein respectively exposing source and drain areas of the active layer ACT.

The first source/drain electrode SD1 and the second source/drain electrode SD2 may be disposed on the interlayer insulating layer ILD, and may be electrically connected to the active layer ACT via the pair of contact-holes, respectively. The active layer ACT may be a semiconductor layer, but aspects of the present disclosure are not limited thereto.

The first source/drain electrode SD1 may be a source electrode, and the second source/drain electrode SD2 may be a drain electrode.

A data signal line in the plurality of first signal lines SL1 formed in the first panel PU1, and the first source/drain electrode SD1 and the second source/drain electrode SD2 may be formed in the same layer and be formed of the same material. The data signal line in the plurality of first signal lines SL1 formed in the first panel PU1 may be electrically connected to the first source/drain electrode SD1 or the second source/drain electrode SD2.

Furthermore, the high-potential voltage signal line in the plurality of first signal line SL1 formed in the first panel PU1 and the first source/drain electrode SD1 and the second source/drain electrode SD2 may be formed in the same layer and be formed of the same material. The high-potential voltage signal line in the plurality of first signal line SL1 formed in the first panel PU1 may be electrically connected to the first source/drain electrode SD1 or the second source/drain electrode SD2.

Therefore, the high-potential voltage signal may be applied to the first source/drain electrode SD1.

The storage capacitor Cst may be spaced apart from the thin-film transistor TFT, and may include a first storage capacitor Cst1 and a second storage capacitor Cst2.

The storage capacitor Cst may store a voltage therein so that the light-emitting element ED continuously maintains a same state for one frame.

The first storage capacitor Cst1 may include a first capacitor electrode ST1 and a second capacitor electrode ST2, and the second storage capacitor Cst2 may include the second capacitor electrode ST2 and a third capacitor electrode ST3.

The first capacitor electrode ST1 may be integrally formed with the light-blocking layer LS.

The second capacitor electrode ST2 may be disposed on the first capacitor electrode ST1, and the second capacitor electrode ST2 may be formed of the same material as a material of the gate electrode GE.

The buffer layer BUF and the gate insulating layer GI may be disposed between the first capacitor electrode ST1 and the second capacitor electrode ST2 and thus may be a dielectric layer constituting the first storage capacitor Cst1. The buffer layer BUF may be an insulating layer, but aspects of the present disclosure are not limited thereto.

The third capacitor electrode ST3 may be integrally formed with the second source/drain electrode SD2.

The second source/drain electrode SD2 may be electrically connected to the light-blocking layer LS via a contact-hole extending through the buffer layer BUF and the interlayer insulating layer ILD.

The interlayer insulating layer ILD may be disposed between the second capacitor electrode ST2 and the third capacitor electrode ST3 and may be a dielectric layer constituting the second storage capacitor Cst2.

A first passivation layer PAS1 may be formed to cover the thin-film transistor TFT.

The first passivation layer PAS1 may serve to prevent penetration of impurities or moisture into the thin-film transistor TFT. The first passivation layer PAS1 may be a first protective layer, but aspects of the present disclosure are not limited thereto.

A first overcoat layer OC1 may be formed on the first passivation layer PAS1.

The first overcoat layer OC1 may be a first planarization layer, and may serve to reduce a step caused by a lower line (or element) such as the thin-film transistor TFT to planarize an upper surface. The first overcoat layer OC1 may be second protective layer, but aspects of the present disclosure are not limited thereto.

The first overcoat layer OC1 may include an organic material, for example, a photoactive compound (PAC). However, aspects of the present disclosure are not limited thereto.

A pair of via-holes or a pair of contact-holes respectively exposing portions of surfaces of the first source/drain electrode SD1 and the second source/drain electrode SD2 may extend through the first overcoat layer OC1 and the first passivation layer PAS1.

A second passivation layer PAS2 including an insulating material may be disposed on the first overcoat layer OC1. The second passivation layer PAS2 may extend along and disposed on an inner side surface of each of the pair of via-holes extending through the first overcoat layer OC1 and the first passivation layer PAS1. The second passivation layer PAS2 may be third protective layer, but aspects of the present disclosure are not limited thereto.

The second passivation layer PAS2 may be formed in a pattern to expose portions of the surfaces of the first source/drain electrode SD1 and the second source/drain electrode SD2.

A first source/drain connection electrode NE1 and a second source/drain connection electrode NE2 may be disposed on the second passivation layer PAS2. The first source/drain connection electrode NE1 may be electrically connected to the first source/drain electrode SD1 via one of the pair of via-holes, and the second source/drain connection electrode NE2 may be electrically connected to the second source/drain electrode SD2 via the other of the pair of via-holes.

The first source/drain electrode SD1 and the first source/drain connection electrode NE1 may be interchangeable with each other. Likewise, the second source/drain electrode SD2 and the second source/drain connection electrode NE2 may be interchangeable with each other.

The light-emitting element ED may be disposed on the second passivation layer PAS2.

The present disclosure describes an example in which the light-emitting element ED is directly bonded onto the first panel PU1 in a self-assembly scheme. However, aspects of the present disclosure are not limited thereto.

In this case, the first panel PU1 may function as a self-assembly substrate capable of fixing the light-emitting element ED thereto in a self-assembly scheme. The first panel PU1 may have a self-assembly structure.

A first assembly electrode AE1, a second assembly electrode AE2, a clad layer CDE, a first line electrode CE1, and an adhesive layer AD may be formed on the second passivation layer PAS2.

The first assembly electrode AE1 and the second assembly electrode AE2 may be spaced apart from each other and may correspond to each of a plurality of light-emitting elements ED assembled in a self-assembly process.

Each of the assembly electrodes AE1 and AE2 may include a transparent electrode material including indium-tin-oxide (ITO), but aspect of the present disclosure are not limited thereto.

The first assembly electrode AE1 and the second assembly electrode AE2 may generate an electric field therebetween when voltage is applied thereto in the self-assembly process. Thus, the light-emitting element ED which has moved into an assembly space between the first assembly electrode AE1 and the second assembly electrode AE2 may be stably fixed therein.

The clad layer CDE may be formed on the first assembly electrode AE1 and the second assembly electrode AE2. The clad layer CDE may cover the first assembly electrode AE1 and the second assembly electrode AE2.

The first assembly electrode AE1 and the second assembly electrode AE2, and the first source/drain connection electrode NE1 and the second source/drain connection electrode NE2 may be formed of the same material and may be disposed in the same layer.

The clad layer CDE may be also formed on the first source/drain connection electrode NE1 and the second source/drain connection electrode NE2. The clad layer CDE may be disposed to cover the first source/drain connection electrode NE1 and the second source/drain connection electrode NE2.

The clad layer CDE may prevent corrosion of the first assembly electrode AE1 and the second assembly electrode AE2 in the self-assembly process carried out in fluid, such that the electric field for the assembly of the light-emitting element ED may be generated easily.

The clad layer CDE may include copper (Cu), but aspects of the present disclosure are not limited thereto.

A spacing (or a distance or an interval) between a pair of clad layers CDE respectively formed on the first assembly electrode AE1 and the second assembly electrode AE2 may be smaller than a spacing (or a distance or an interval) between the first assembly electrode AE1 and the second assembly electrode AE2.

Accordingly, an assembly position of the light-emitting element ED disposed in the assembly space formed between the first assembly electrode AE1 and the second assembly electrode AE2 may be more accurately fixed.

A third passivation layer PAS3 may be disposed on the clad electrode layer CDE.

A portion of the third passivation layer PAS3 may cover a partial area of an upper portion of the clad electrode layer CDE while a remaining portion of the third passivation layer PAS3 may cover an entire surface of the base substrate 100. The third passivation layer PAS3 may be a fourth protective layer, but aspects of the present disclosure are not limited thereto.

The third passivation layer PAS3 may be formed not to cover an area corresponding to the assembly space formed between the first assembly electrode AE1 and the second assembly electrode AE2 to be exposed.

The assembly space formed in this way may designate a position to which the light-emitting element ED is fixed.

An adhesive layer AD may be disposed on a portion of the clad electrode layer CDE corresponding to the assembly space, and the adhesive layer AD may serve to adhesively fix the light-emitting element ED to the clad electrode layer.

The adhesive layer AD may be formed of a thermo-curable material or a photo-curable material. However, aspects of the present disclosure are not limited thereto.

The light-emitting element ED may be disposed on the adhesive layer AD.

The present disclosure describes an example in which the light-emitting element ED is embodied as a vertical micro-LED. However, aspects of the present disclosure are not limited thereto, and the light-emitting element ED may be embodied as a horizontal micro-LED.

Alternatively, the light-emitting element ED may be embodied as a micro-LED having a flip chip shape or a micro-LED having a nano-rod shape.

The light-emitting element ED may include a semiconductor structure NSS, a first electrode E1, and a second electrode E2.

The first electrode E1 of the light-emitting element ED may act as a first cathode electrode, and the second electrode E2 thereof may act as a first anode electrode.

The semiconductor structure NSS may be embodied as a nitride semiconductor structure, and may include a first semiconductor layer, an active layer disposed on one side of the first semiconductor layer, and a second semiconductor layer.

The first electrode E1 may be disposed on one surface of the first semiconductor layer where the active layer is not disposed, and the second electrode E2 may be disposed on one surface of the second semiconductor layer where the active layer is not disposed.

For example, the first electrode E1 may be formed to extend from one surface of the first semiconductor layer to a portion of a side surface of the first semiconductor layer.

The first semiconductor layer may be configured for supplying electrons to the active layer ACT, and may include a nitride semiconductor having first conductivity type impurities. For example, the first conductivity-type impurity may include an N-type impurity.

The active layer ACT may include a Multi-Quantum-Well (MQW) structure. The second semiconductor layer may be configured for injecting holes into the active layer, and may include a nitride semiconductor having second conductivity type impurities. For example, the second conductivity type impurity may include a P type impurity.

A protective layer pattern PT may be formed to cover at least a portion of an outer surface of the light-emitting element ED. A protective layer pattern PT may be a protective layer, but aspects of the present disclosure are not limited thereto.

The protective layer pattern PT may serve to prevent damage that may occur to a side surface of the semiconductor structure NSS in a dry etching process to form the semiconductor structure NSS, thereby supplementing the characteristics of the light-emitting element ED.

The other surface of the first semiconductor layer opposite to one surface of the first semiconductor layer on which the active layer is disposed may contact the adhesive layer AD such that the light-emitting element ED may be fixed to the adhesive layer AD.

A first line electrode CE1 disposed to surround the first electrode E1 may be formed on a side surface of the light-emitting element ED and may contact and be electrically connected to the first electrode E1.

One side of the first line electrode CE1 may cover the clad layer CDE, and may contact and be electrically connected to the clad layer CDE.

Further, a second line connection electrode LCE2 may be formed on the light-emitting element ED, and may contact and be electrically connected to the second electrode E2. The second line connection electrode LCE2 may be referred to as a second line electrode CE2.

A second overcoat layer OC2 may be formed to cover the light-emitting element ED.

The second overcoat layer OC2 may be a second planarization layer, and may serve to reduce a step caused by an underlying element such as the light-emitting element ED to provide a planarized a surface. The second overcoat layer OC2 may be a fifth protective layer, but aspects of the present disclosure are not limited thereto.

The second overcoat layer OC2 may include an organic material, for example, a photoactive compound (PAC). However, aspects of the present disclosure are not limited thereto.

A first line connection electrode LCE1, the second line connection electrode LCE2, and a third line connection electrode LCE3 may be formed on the second overcoat layer OC2.

The first line connection electrode LCE1, the second line connection electrode LCE2, and the third line connection electrode LCE3 may be formed in the same layer and be formed of the same material.

In the plan view, the second line connection electrode LCE2 may be disposed between the first line connection electrode LCE1 and the third line connection electrode LCE3.

For example, both the first line connection electrode LCE1 and the third line connection electrode LCE3 may be electrically connected to the high-potential voltage signal line that applies a high-potential voltage signal.

Each of a pair of contact-holes in the second overcoat layer OC2 may extend through the second overcoat layer OC2 and the third passivation layer PAS3 to expose a portion of a surface of the clad layer CDE disposed on each of the first source/drain connection electrode NE1 and the second source/drain connection electrode NE2.

Further, the second overcoat layer OC2 may be formed to expose at least a portion of a surface of the second electrode E2 of the light-emitting element ED. For example, the second overcoat layer OC2 may be formed not to cover at least a portion of a surface of the second electrode E2 of the light-emitting element ED to be exposed.

Accordingly, the first line connection electrode LCE1 may be electrically connected to the first source/drain connection electrode NE1 via a portion of the clad layer CDE exposed to an outside through one of the contact-holes. The second line connection electrode LCE2 may be electrically connected to the second source/drain connection electrode NE2 via a portion of the clad layer CDE exposed to the outside through the other of the contact-holes.

In this case, the second line connection electrode LCE2 having one side electrically connected to the second source/drain connection electrode NE2 may cover an upper portion of the light-emitting element ED to be electrically connected to the second electrode E2 as a first anode electrode.

Accordingly, the second line connection electrode LCE2 may be referred to as a first anode connection electrode electrically connected to the second electrode E2 as the first anode electrode.

Therefore, the first anode connection electrode as the second line connection electrode LCE2 may electrically connect the second source/drain electrode SD2 of the thin-film transistor TFT, and the second electrode E2 as the first anode electrode of the light-emitting element ED to each other, such that the driving signal from the thin-film transistor TFT may be applied to the first anode electrode of the light-emitting element ED.

As previously described, each of the first panel PU1 and the second panel PU2 may be the same single display panel.

Therefore, the first panel PU1 and the second panel PU2 may have the same stacked structure. Thus, the second panel PU2 may be described in the same way as a manner in which the first panel PU1 has been described previously. Thus, redundant descriptions may be omitted.

The base substrate 100 of the first panel PU1 and the base substrate 200 of the second panel PU2 may be disposed to be spaced apart from each other with a maximal spacing. That is, the base substrate 100 of the first panel PU1 may face downwardly, and the base substrate 200 of the second panel PU2 may face upwardly.

Therefore, the first line connection electrode LCE1, the second line connection electrode LCE2, and the third line connection electrode LCE3 of the first panel PU1 may be adjacent to and be disposed to face the third line connection electrode LCE3, the second line connection electrode LCE2, and the first line connection electrode LCE1 of the second panel PU2, respectively.

The first panel PU1 and the second panel PU2 are electrically connected to each other by the contact member CM disposed between the third line connection electrode LCE3 of the first panel PU1 and the first line connection electrode LCE1 of the second panel PU2. Thus, the line signal STP may pass through the first panel PU1 and the second panel PU2 in a vertical direction (or up and down direction).

For example, the contact member CM may be disposed between the third line connection electrode LCE3 of the first panel PU1(1) and the first line connection electrode LCE1 of the second panel PU2(2). Thus, the line signal STP may flow from the first panel PU1(1) to the second panel PU2(2).

Next, the line signal STP applied to the second panel PU2(2) may flow from the second panel PU2(2) to the first panel PU1(3) by the contact member CM disposed between the first line connection electrode LCE1 of the second panel PU2(2) and the third line connection electrode LCE3 of the first panel PU1(3).

Next, the line signal STP applied to the first panel PU1(3) may flow from the first panel PU1(3) to the second panel PU2(4) by the contact member CM disposed between the third line connection electrode LCE3 of the first panel PU1(3) and the first line connection electrode LCE1 of the second panel PU2(4).

Accordingly, in the display apparatus 1 according to an aspect of the present disclosure, due to the arrangement structure of the first panel PU1 and the second panel PU2 and the connection relationship of the contact member CM therewith, one display panel may be electrically connected to another one display panel even without a separate wiring substrate to allow the line signal STP to alternately pass through entire display panels of the display apparatus 1.

Hereinafter, with reference to FIG. 4 to FIG. 6, a display apparatus according to a second aspect of the present disclosure will be described in detail.

As for the display apparatus of the second aspect to be described below, repeated descriptions of the display apparatus according to the first aspect may be omitted.

One first group PUG1 may include a plurality of first panels PU1 sequentially arranged in a first direction and/or a second direction.

Figure 4:
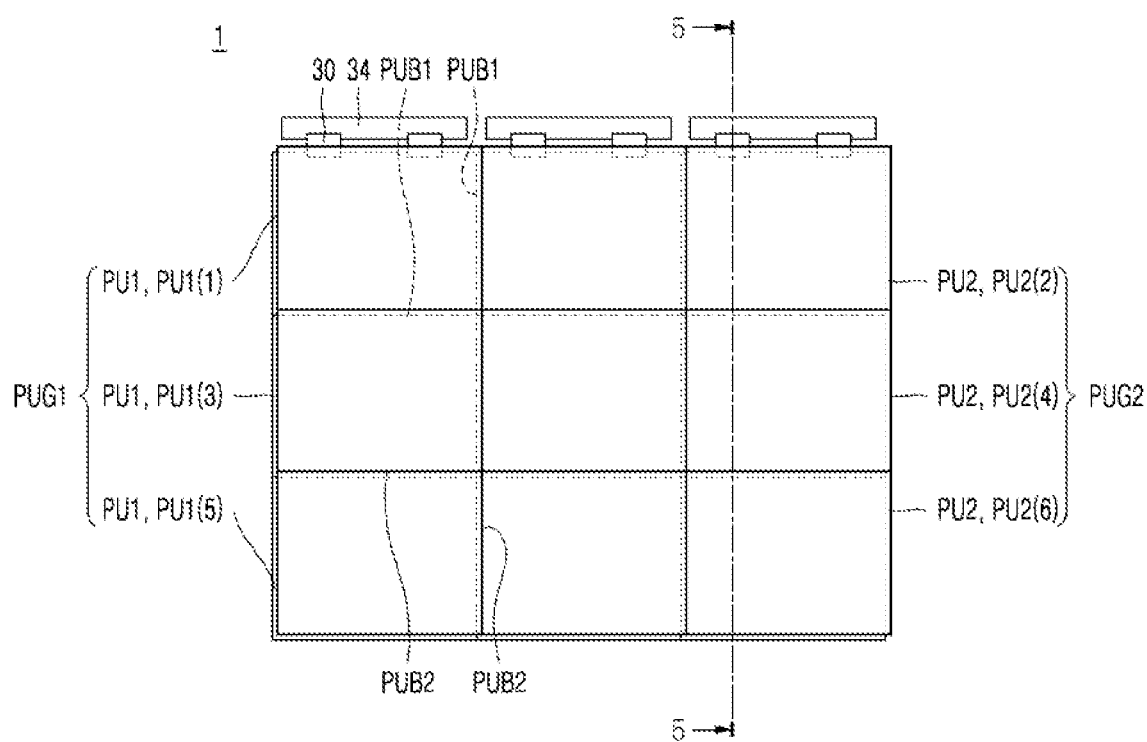
FIG. 4 is a plan view showing a stacked structure of the display apparatus according to a second aspect of the present disclosure.
Figure 5:
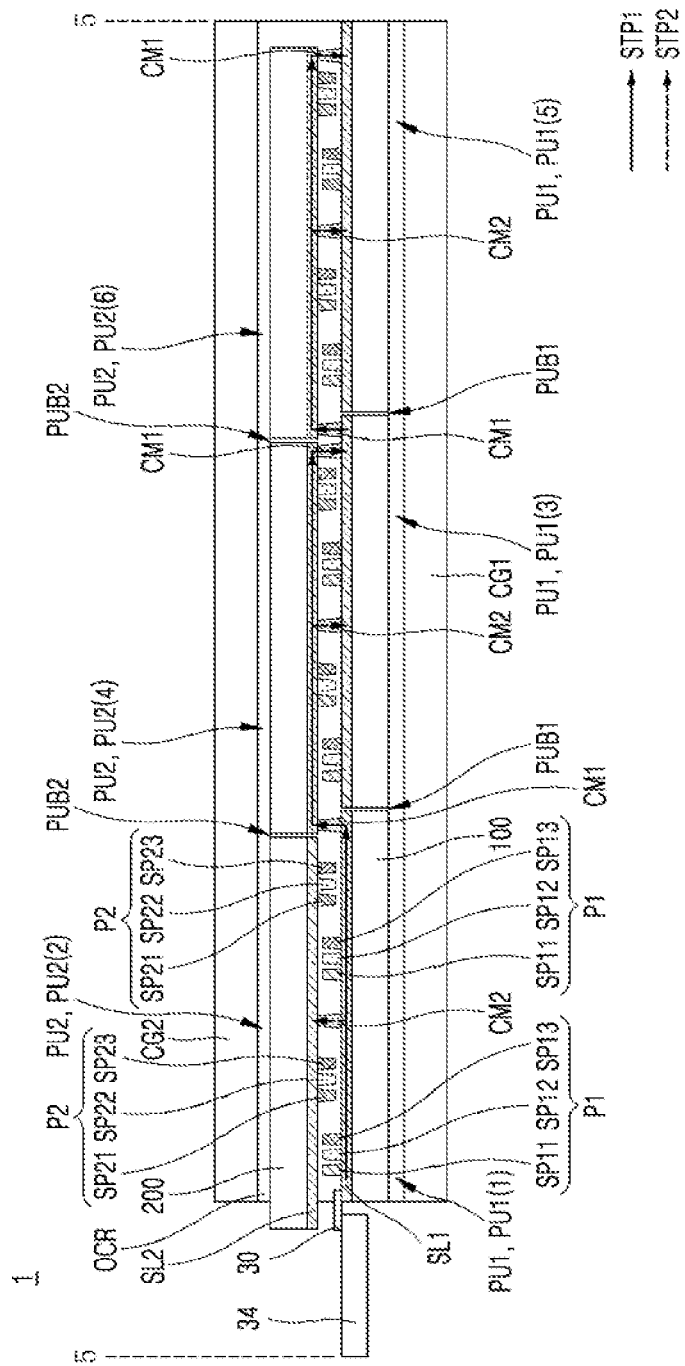
FIG. 5 is a cross-sectional view showing flow of a line signal of the display apparatus according to the second aspect of the present disclosure.

Referring to FIG. 4, the first direction as used herein may be the column direction, and the second direction may be the row direction.

However, aspects of the present disclosure are not limited thereto, for example, the first group PUG1 may be composed of one first panel PU1.

FIG. 4 illustrates one example in which the first panels PU1 are arranged in 3 rows and 3 columns. However, aspects of the present disclosure are not limited thereto.

For convenience of description, the plurality of first panels PU1 arranged in the first direction may be referred to as a first panel PU1(2n−1). In this case, n is a natural number.

Therefore, the first panels PU1 arranged in the first direction shown in FIG. 4 may include a first panel PU1(1), a first panel PU1(3), and a first panel PU1(5).

Each of the plurality of first panels PU1 may be composed of a same single panel having one type.

Therefore, the plurality of first panels PU1 may have the same size and shape.

The first panel PU1 may be a first display panel.

Therefore, the first panel PU1 may include a plurality of first pixel parts P1 arranged on a first substrate 100, and a plurality of first signal lines SL1 that apply various line signals to the plurality of first pixel parts P1.

The circuit film 30 that transmits various line signals to the display apparatus 1 may be disposed at one side (or one portion) of the first panel PU1 to be electrically connected to the first panel PU1.

One or more printed circuit boards 34 may be electrically connected to the other side (or the other portion) of the circuit film 30 opposite to one side of the circuit film 30 connected to the first panel PU1.

Various voltages and signals generated in this way may be transmitted to the first signal line SL1 of the first panel PU1 by the circuit film 30.

In this way, various voltages and signals transmitted through the circuit film 30 may be supplied to each of the first pixel parts P1 through the first signal line SL1.

One second group PUG2 may include a plurality of second panels PU2 sequentially arranged in the first direction and/or the second direction.

However, aspects of the present disclosure are not limited thereto, for example, the second group PUG2 may be composed of one second panel PU2.

FIG. 4 illustrates one example in which the second panels PU2 are arranged in 3 rows and 3 columns. However, aspects of the present disclosure are not limited thereto.

For convenience of description, the plurality of second panels PU2 arranged in the first direction may be referred to as a second panel PU2(2n). In this case, n is a natural number.

Therefore, the second panels PU2 arranged in the first direction shown in FIG. 4 may include a second panel PU2(2), a second panel PU2(4), and a second panel PU2(6).

The plurality of second panels PU2 may be a same single panel having one type.

Therefore, the plurality of second panels PU2 may be a same panel having the same size and shape.

The second panel PU2 may be a second display panel.

Therefore, the second panel PU2 may include a plurality of second pixel parts P2 arranged on a second substrate 200, and a plurality of second signal lines SL2 that apply various line signals to the plurality of second pixel parts P2.

In this case, the second panel PU2 and the first panel PU1 may be the same panel having the same size and shape.

In other words, each of the first panel PU1 and the second panel PU2 may be a single panel having one type.

However, in a plan view of the display apparatus, a position of the first panel PU1 and a position of the second panel PU2 may be different from each other.

The second group PUG2 may be stacked on the first group PUG1 so that the second group PUG2 is not aligned with the first group PUG1 in the plan view.

For example, the first group PUG1 and the second group PUG2 are stacked on each other such that a boundary part PUB1 between adjacent ones of the plurality of first panels PU1 and a boundary part PUB2 between adjacent ones of the plurality of second panels PU2 are not aligned with each other in the plan view.

For example, the boundary part PUB1 between adjacent ones of the plurality of first panels PU1 arranged along the first direction and/or the second direction may be disposed along approximately a periphery of the second panel PU2.

Furthermore, the boundary part PUB2 between adjacent ones of the plurality of second panels PU2 arranged along the first direction and/or the second direction may be disposed along approximately a periphery of the first panel PU1.

Therefore, with respect to the first direction and/or the second direction, one first panel PU1 and one second panel PU2 may be disposed such that a substantial area except for the periphery part of one first panel PU1 overlaps a substantial area except for the periphery part of one second panel PU2.

In this structure, a total number of the first panels PU1 disposed in the first group PUG1 may be equal to a total number of the second panels PU2 disposed in the second group PUG2.

Accordingly, in the plan view, the first panels PU1 and the second panels PU2 may be arranged in a zigzag manner along the first direction and/or the second direction, such that the first panels PU1 and the second panels PU2 stacked in a vertical direction (or up and down direction) may be arranged alternately with each other in the plan view.

For example, the second panel PU2 (2) disposed on an upper portion of the first panel PU1 (1) to which the circuit film 30 is connected to overlap the first panel PU1 (1), the second panel PU2 (4), the first panel PU1 (3), the second panel PU2 (6), and the first panel PU1 (5) may be arranged sequentially and alternately with each other in this order in a direction away from the circuit film 30.

The first group PUG1 and the second group PUG2 may be electrically connected to each other via a plurality of contact members CM disposed between the first panel PU1 and the second panel PU2.

For example, the first signal line SL1 of the first panel PU1 may be electrically connected to the second signal line SL2 of the second panel PU2 by the contact member CM.

The plurality of contact members CM may include a plurality of first contact members CM1 and a plurality of second contact members CM2 arranged along the flow direction of the line signal.

In this case, the line signal STP may include a first line signal STP1 and a second line signal STP2.

The first line signal STP1 passes alternately through the first panels PU1 arranged in one direction and the second panels PU2 arranged in one direction, such that the first line signal STP1 passes continuously through the first panels PU1 and the second panel units PU2 arranged in zigzag manner.

Furthermore, the second line signal STP2 flows between the first panel PU1 and the second panel PU2 stacked in the vertical direction (or up and down direction) to overlap each other such that the second line signal STP2 flows to the first panel PU1 or the second panel PU2 in one way direction.

Therefore, the second line signal STP2 may be a line signal with a flow direction branching from the first line signal STP1 which flows along a line signal flow path extending in an elongate manner in one direction.

One first panel PU1 may be electrically connected to two adjacent second panels PU2 by the first contact member CM1 and the second contact member CM2, respectively.

For example, the first line signal STP1 may alternately pass through the first panels PU1 and the second panels PU2 by the plurality of first contact members CM1.

Therefore, the first line signal STP1 may pass through the first panel PU1(1) to which the circuit film 30 is connected, the second panel PU2(4), the first panel PU1(3), the second panel PU2(6), and the first panel PU1(5) sequentially in this order.

The second line signal STP2 may flow between the first panel PU1 and the second panel PU2 which have the largest area (or size) overlapping each other in the vertical direction (or up and down direction) by the plurality of second contact members CM2.

For example, the second line signal STP2 may branch off from the first line signal STP1 traveling along the first signal line SL1 of the first panel PU1 (1) to be transferred to the second panel PU2 (2). The second line signal STP2 may branch off from the first line signal STP1 which flows along the second signal line SL2 of the second panel PU2 (4) to be directed to the first panel PU1 (3). The second line signal STP2 may branch off from the first line signal STP1 which flows along the second signal line SL2 of the second panel PU2 (6) to be transferred to the first panel PU1 (5).

In this case, the second line signal STP2 may include a driving signal that drives the pixel part of the panel to which the second line signal STP2 is applied.

For example, a panel in which the first line signal STP1 passes through only the periphery area thereof among panels through which the first line signal STP1 passes may receive not the first line signal STP1 but the second line signal STP2 as the driving signal that drives the pixel part thereof.

The first group PUG1 and the second group PUG2 may be bonded (or attached) to each other by the optical resin layer OCR disposed between the first group PUG1 and the second group PUG2.

The first cover part CG1 and the second cover part CG2 may be additionally disposed at a portion of the first group PUG1 and a portion of the second group PUG2, respectively.

Figure 6:
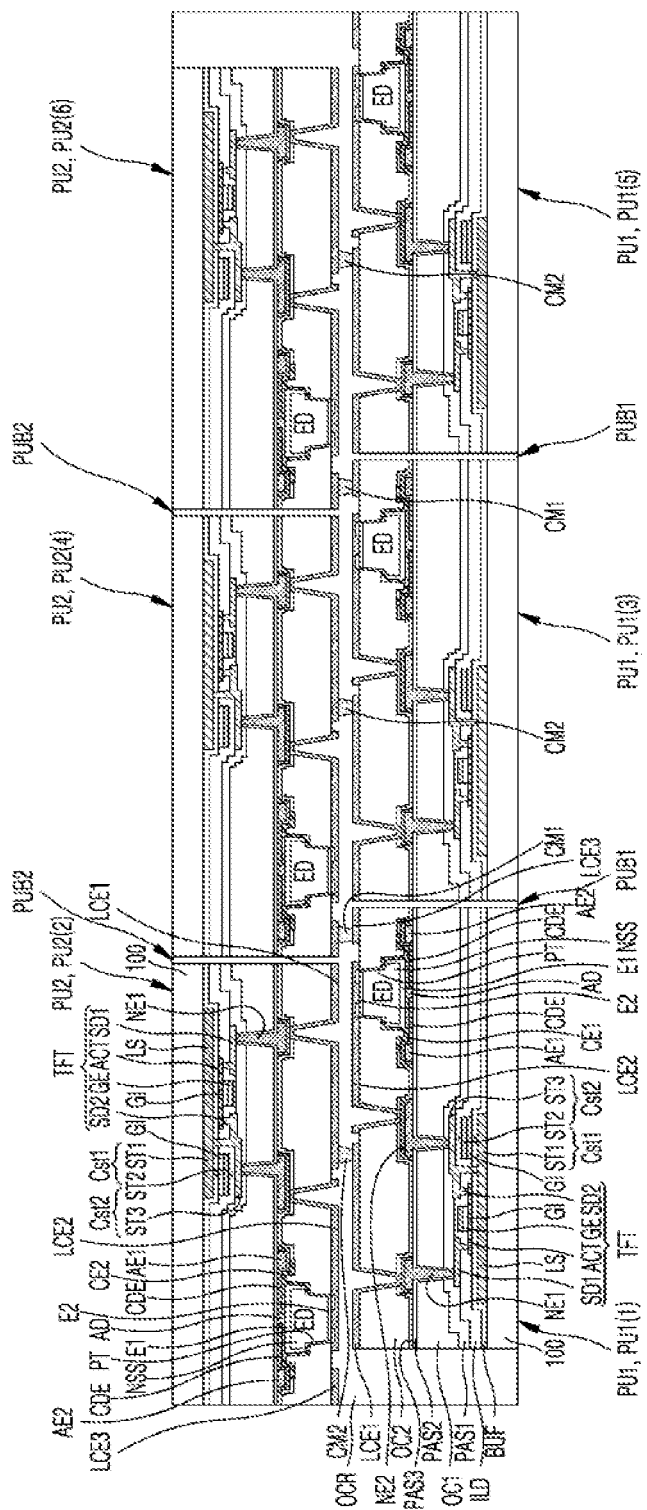
FIG. 6 is a detailed cross-sectional view of the display apparatus according to the second aspect of the present disclosure.

Referring to FIG. 6, the second panels PU2 and the first panels PU1 may be electrically connected to each other by the first contact members CM1 and the second contact members CM2 disposed between the first line connection electrodes LCE1 and the third line connection electrodes LCE3 thereof. Thus, the line signal STP may pass alternately the first panels PU1 and the second panels PU2 in the vertical direction (or up and down direction) by the first contact members CM1 and the second contact members CM2.

For example, the first contact member CM1 may be disposed between the third line connection electrode LCE3 of the first panel PU1(1) and the third line connection electrode LCE3 of the second panel PU2(4). Thus, the first line signal STP1 may pass from the first panel PU1(1) to the second panel PU2(4) by the first contact member CM1.

Further, the second contact member CM2 may be disposed between the first line connection electrode LCE1 of the first panel PU1(1) and the first line connection electrode LCE1 of the second panel PU2(2). The second line signal STP2 may pass from the first panel PU1(1) to the second panel PU2(2) by the second contact member CM2.

Next, the first line signal STP1 applied to the second panel PU2(4) may flow to the first panel PU1(3). Then, the first line signal STP1 having flowed to the first panel PU1(3) may flow to the second panel PU2(6) by the first contact member CM1 disposed between the third line connection electrode LCE3 of the first panel PU1(3) and the third line connection electrode LCE3 of the second panel PU2(6).

Further, the second contact member CM2 may be disposed between the first line connection electrode LCE1 of the first panel PU1(3) and the first line connection electrode LCE1 of the second panel PU2(4) such that the second line signal STP2 passes from the second panel PU2(4) to the first panel PU1(3).

In this way, in the display apparatus 1 according to an aspect of the present disclosure, due to the arrangement structure of the first panel PU1 and the second panel PU2 and the connection relationship of the first contact member CM1 and the second contact member CM2 therewith, one display panel may be electrically connected to another one panel even without a separate wiring substrate to allow the line signal STP to alternately pass through all of the display panels of the display apparatus 1.

Hereinafter, a display apparatus according to a third aspect of the present disclosure will be described in detail, referring to FIG. 7 to FIG. 9.

As for the display apparatus of the third aspect to be described below, repeated descriptions of the display apparatuses according to the first and second aspects as described above may be omitted.

One first group PUG1 may include a plurality of first panels PU1 sequentially arranged in the first direction and/or the second direction.

Figure 7:
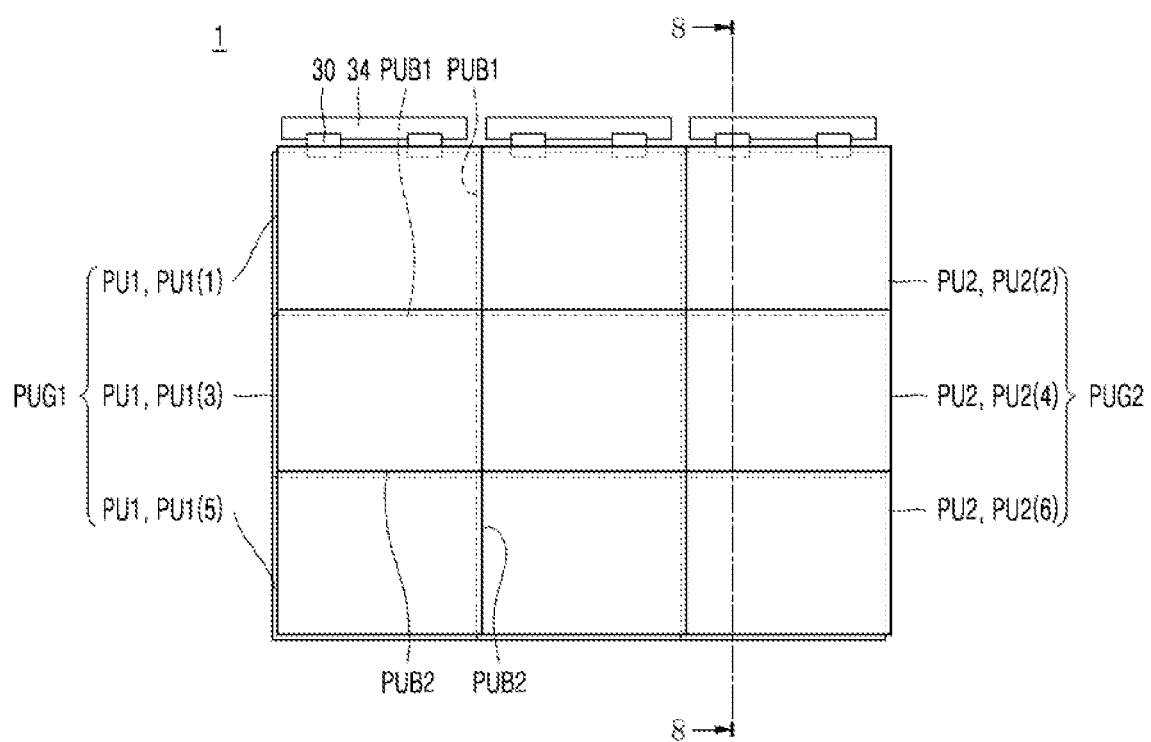
FIG. 7 is a plan view showing a stacked structure of a display apparatus according to a third aspect of the present disclosure.
Figure 8:
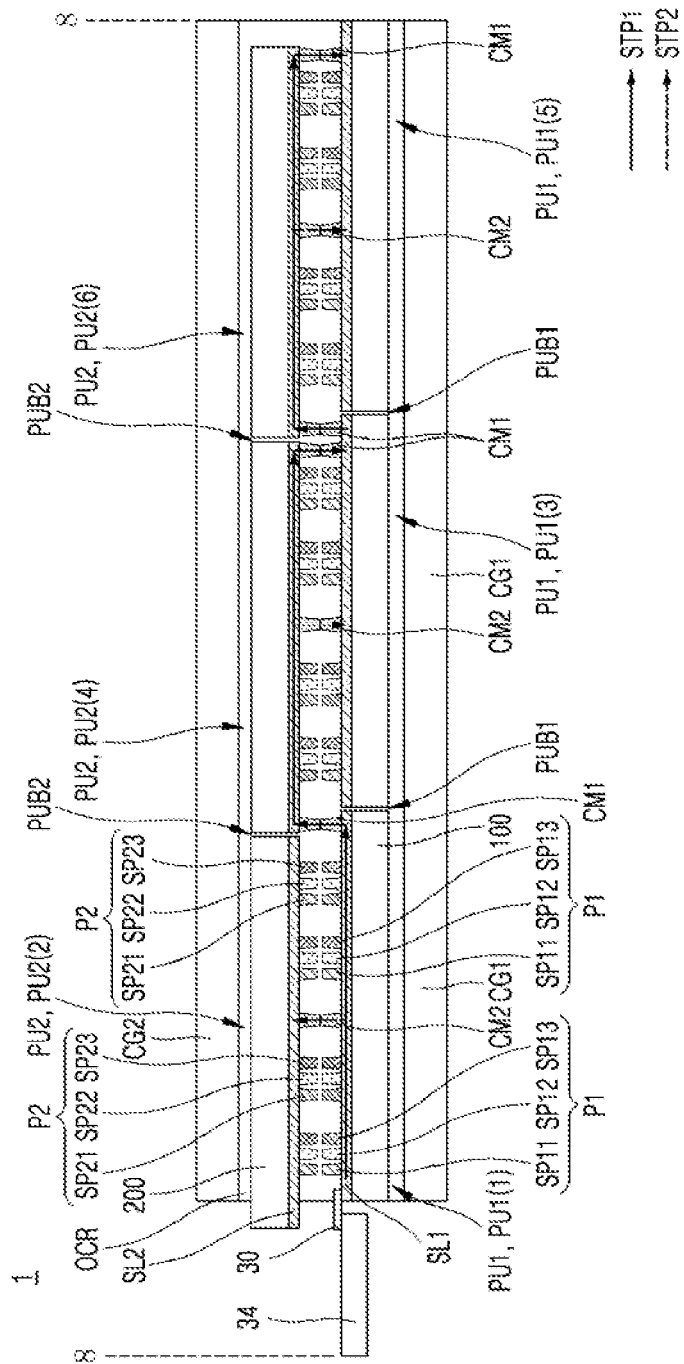
FIG. 8 is a cross-sectional view showing flow of a line signal of a display apparatus according to the third aspect of the present disclosure.

Referring to FIG. 7, the first direction as used herein may be the column direction, and the second direction may be the row direction.

However, aspects of the present disclosure are not limited thereto, for example, the first group PUG1 may be composed of one first panel PU1.

FIG. 7 illustrates one example in which the first panels PU1 are arranged in 3 rows and 3 columns. However, aspects of the present disclosure are not limited thereto.

For convenience of description, the plurality of first panels PU1 arranged in the first direction may be referred to as a first panel PU1($2n-1$). In this case, n is a natural number.

Therefore, the first panels PU1 arranged in the first direction shown in FIG. 7 may include a first panel PU1(1), a first panel PU1(3), and a first panel PU1(5).

Each of the plurality of first panels PU1 may be a same single panel having one type.

Therefore, the plurality of first panels PU1 may be a same panels having the same size and shape.

The first panel PU1 may be a first display panel.

Therefore, the first panel PU1 may include a plurality of first pixel parts P1 arranged on the first substrate 100, and a plurality of first signal lines SL1 that apply various line signals to the plurality of first pixel parts P1.

The circuit film 30 that transmits various line signals to the display apparatus 1 may be disposed on one side (or one portion) of the first panel PU1 to be electrically connected to the first panel PU1.

One or more printed circuit boards 34 may be electrically connected to the other side (or the other portion) of the circuit film 30 opposite to one side of the circuit film 30 connected to the first panel PU1.

Various voltages and signals generated in this way may be transmitted to the first signal line SL1 of the first panel PU1 via the circuit film 30.

In this way, various voltages and signals transmitted through the circuit film 30 may be supplied to each of the first pixel parts P1 through the first signal line SL1.

One second group PUG2 may include a plurality of second panels PU2 sequentially arranged in the first direction and/or the second direction.

However, aspects of the present disclosure are not limited thereto, for example, the second group PUG2 may be composed of one second panel PU2.

FIG. 7 illustrates one example in which the second panels PU2 are arranged in 3 rows and 3 columns. However, aspects of the present disclosure are not limited thereto.

For convenience of description, the plurality of second panels PU2 arranged in the first direction may be referred to as a second panel PU2($2n$). In this case, n is a natural number.

Therefore, the second panels PU2 arranged in the first direction shown in FIG. 7 may include a second panel PU2(2), a second panel PU2(4), and a second panel PU2(6).

Each of the plurality of second panels PU2 may be a same single panel having one type or same type.

Therefore, the plurality of second panels PU2 may be a same panel having the same size and shape.

The second panel PU2 may be a second display panel.

Therefore, the second panel PU2 may include a plurality of second pixel parts P2 arranged on a second substrate 200, and a plurality of second signal lines SL2 that apply various line signals to the plurality of second pixel parts P2.

In this case, the second panel PU2 and the first panel PU1 may be the same panel having the same size and shape.

In other words, each of the first panel PU1 and the second panel PU2 may be a same single panel having one type or a same type.

However, in a plan view of the display apparatus, a stack position of the first panel PU1 and a stack position of the second panel PU2 may be different from each other, and the first panel PU1 and the second panel PU2 may be a single display panel.

The second group PUG2 may be stacked on the first group PUG1 so that the second group PUG2 is not aligned with the first group PUG1 in the plan view.

For example, the first group PUG1 and the second group PUG2 are stacked on each other such that a boundary part PUB1 between adjacent ones of the plurality of first panels PU1 and a boundary part PUB2 between adjacent ones of the plurality of second panels PU2 are not aligned with each other in the plan view.

For example, the boundary part PUB1 between adjacent ones of the plurality of first panels PU1 arranged along the first direction and/or second direction may be disposed along approximately a periphery of the second panel PU2.

Furthermore, the boundary part PUB2 between adjacent ones of the plurality of second panels PU2 arranged along the first direction and/or second direction may be disposed along approximately a periphery of the first panel PU1.

Therefore, with respect to the first direction and/or the second direction, the first panel PU1 and the second panel PU2 may be disposed such that a substantial area except for the periphery part of one first panel PU1 overlaps a substantial area except for the periphery part of one second panel PU2.

In this structure, a total number of the first panels PU1 disposed in the first group PUG1 may be equal to a total number of the second panels PU2 disposed in the second group PUG2.

Accordingly, in the plan view, the first panels PU1 and the second panels PU2 may be arranged in a zigzag manner along the first direction and/or the second direction, such that the first panels PU1 and the second panels PU2 stacked in a vertical direction (or up and down direction) may be arranged alternately with each other in the plan view.

For example, the second panel PU2 (2) disposed on top of the first panel PU1 (1) to which the circuit film 30 is connected to overlap the first panel PU1 (1), the first panel PU1 (1), the second panel PU2 (4), the first panel PU1 (3), the second panel PU2 (6), and the first panel PU1 (5) may be arranged sequentially and alternately with each other in this order in a direction away from the circuit film 30.

The first group PUG1 and the second group PUG2 may be electrically connected to each other by a plurality of contact members CM disposed between the first panel PU1 and the second panel PU2.

For example, the first signal line SL1 of the first panel PU1 may be electrically connected to the second signal line SL2 of the second panel PU2 by the contact member CM.

The plurality of contact members CM may include a plurality of first contact members CM1 and a plurality of second contact members CM2 arranged along the flow direction of the line signal.

In this case, the line signal STP may include a first line signal STP1 and a second line signal STP2.

The first line signal STP1 passes alternately through the first panels PU1 arranged in one direction and the second panels PU2 arranged in one direction, such that the first line signal STP1 passes continuously through the first panels PU1 and the second panels PU2 arranged in zigzag manner.

Furthermore, the second line signal STP2 flows between the first panel PU1 and the second panel PU2 stacked in the vertical direction to overlap each other such that the second line signal STP2 flows to the first panel PU1 or the second panel PU2 in one way direction.

Therefore, the second line signal STP2 may be a line signal with a flow direction branching from the first line signal STP1 which flows along a line signal flow path extending in an elongate manner in one direction.

One first panel PU1 may be electrically connected to two adjacent second panels PU2 by the first contact member CM1 and the second contact member CM2, respectively.

For example, the first line signal STP1 may alternately pass through the first panels PU1 and the second panels PU2 by the plurality of first contact members CM1.

Therefore, the first line signal STP1 may pass through the first panel PU1(1) to which the circuit film 30 is connected, the second panel PU2(4), the first panel PU1(3), the second panel PU2(6), and the first panel PU1(5) sequentially in this order.

The second line signal STP2 may pass between the first panel PU1 and the second panel PU2 which have the largest area overlapping each other in the vertical direction (or up and down direction) by the plurality of second contact members CM2.

For example, the second line signal STP2 may branch off from the first line signal STP1 traveling along the first signal line SL1 of the first panel PU1 (1) to be transferred to the second panel PU2 (2). The second line signal STP2 may branch off from the first line signal STP1 which flows along the second signal line SL2 of the second panel PU2 (4) to be directed to the first panel PU1 (3). The second line signal STP2 may branch off from the first line signal STP1 which flows along the second signal line SL2 of the second panel PU2 (6) to be transferred to the first panel PU1 (5).

In this case, the second line signal STP2 may include a driving signal that drives the pixel of the panel to which the second line signal STP2 is applied.

For example, a panel in which the first line signal STP1 passes through only the periphery area thereof among panels through which the first line signal STP1 passes may receive not the first line signal STP1 but the second line signal STP2 as the driving signal that drives the pixel thereof.

In the third aspect, the plurality of first pixel parts P1 and the plurality of second pixel parts P2 may be disposed such that at least partial areas thereof overlap each other in the vertical direction (or up and down direction).

For example, the first pixel part P1 may include the first sub-pixel SP11 emitting light of a first color, the first sub-pixel SP12 emitting light of a second color, and the first sub-pixel SP13 emitting light of a third color. The second pixel part P2 may include the second sub-pixel SP21 emitting light of a first color, the second sub-pixel SP22 emitting light of a second color, and the second sub-pixel SP23 emitting light of a third color.

In this case, the first sub-pixel SP11 emitting light of the first color may be disposed to overlap with the second sub-pixel SP21 emitting light of the first color. The first sub-pixel SP12 emitting light of the second color may be disposed to overlap with the second sub-pixel SP22 emitting light of the second color. The first sub-pixel SP13 emitting light of the third color may be disposed to overlap the second sub-pixel SP23 emitting light of the third color.

In this way, the first pixel part P1 and the second pixel part P2 disposed in the first panel PU1 and the second panel PU2, respectively, may be disposed such that at least partial areas thereof overlap each other, so that a difference between light-emissions of the light-emitting area and the transmissive area may be reduced and the luminance of the display apparatus may be improved.

In this case, the first contact member CM1 and the second contact member CM2 disposed between the first panel PU1 and the second panel PU2 may be respectively composed of a plurality of first contact sub-members stacked in the vertical direction (or up and down direction), and a plurality of second contact sub-members stacked in the vertical direction (or up and down direction). However, aspects of the present disclosure are not limited thereto.

The first group PUG1 and the second group PUG2 may be bonded (or attached) to each other by the optical resin layer OCR disposed between the first group PUG1 and the second group PUG2. For example, the optical resin layer OCR may include optically cleared resin (OCR).

Figure 9:
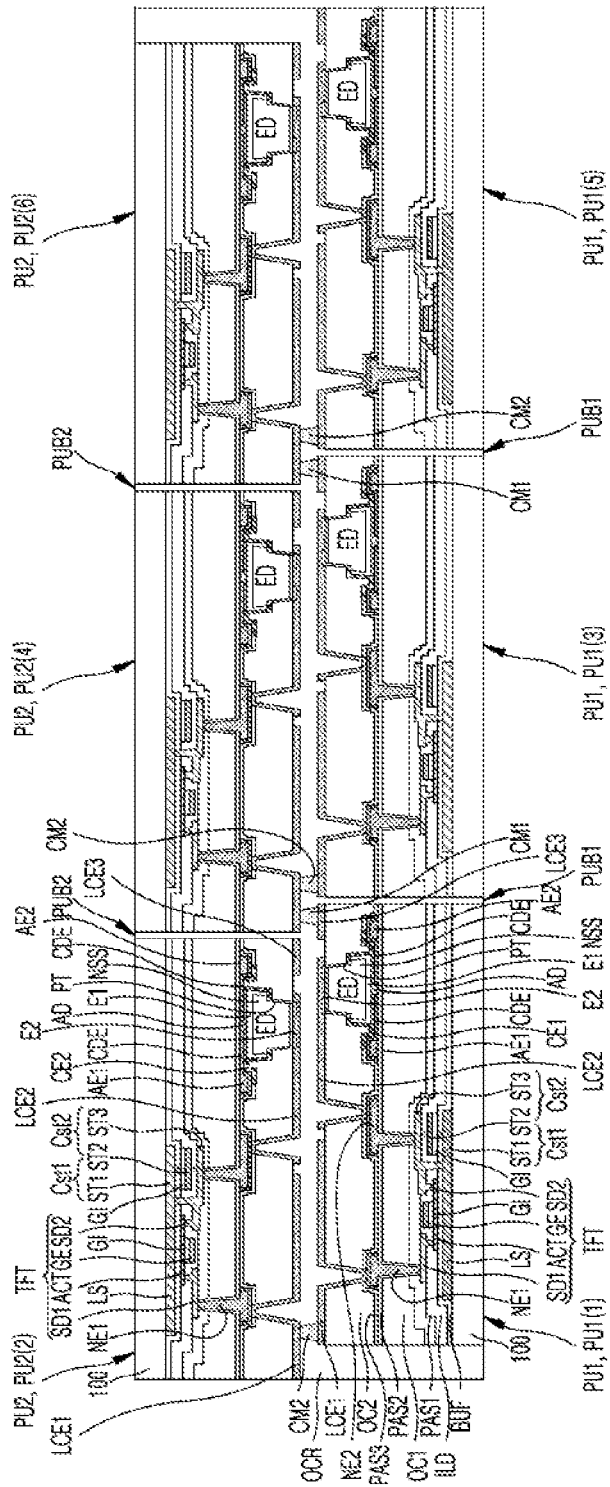
FIG. 9 is a detailed cross-sectional view of the display apparatus according to the third aspect of the present disclosure.

Referring to FIG. 9, the second panels PU2 and the first panels PU1 may be electrically connected to each other by the first contact members CM1 and the second contact members CM2 disposed between the first line connection electrodes LCE1 and the third line connection electrodes LCE3 thereof. Thus, the line signal STP may pass alternately the first panels PU1 and the second panels PU2 in the vertical direction by the first contact members CM1 and the second contact members CM2.

For example, the first contact member CM1 may be disposed between the third line connection electrode LCE3 of the first panel PU1(1) and the third line connection electrode LCE3 of the second panel PU2(4). Thus, the first line signal STP1 may pass from the first panel PU1(1) to the second panel PU2(4) by the first contact member CM1.

Further, the second contact member CM2 may be disposed between the first line connection electrode LCE1 of the first panel PU1(1) and the first line connection electrode LCE1 of the second panel PU2(2). The second line signal STP2 may pass from the first panel PU1(1) to the second panel PU2(2) by the second contact member CM2.

Next, the first line signal STP1 applied to the second panel PU2(4) may flow to the first panel PU1(3). Then, the first line signal STP1 having flowed to the first panel PU1(3) may flow to the second panel PU2(6) by the first contact member CM1 disposed between the third line connection electrode LCE3 of the first panel PU1(3) and the third line connection electrode LCE3 of the second panel PU2(6).

Further, the second contact member CM2 may be disposed between the first line connection electrode LCE1 of the first panel PU1(3) and the first line connection electrode LCE1 of the second panel PU2(4) such that the second line signal STP2 passes from the second panel PU2(4) to the first panel PU1(3).

In this way, in the display apparatus 1 according to an aspect of the present disclosure, due to the arrangement structure of the first panel PU1 and the second panel PU2 and the connection relationship of the first contact member CM1 and the second contact member CM2 therewith, one display panel may be electrically connected to another one display panel even without a separate wiring substrate to allow the line signal STP to alternately pass through entire display panels of the display apparatus 1.

Hereinafter, a display apparatus according to a fourth aspect of the present disclosure will be described in detail, referring to FIG. 10 to FIG. 12.

As for the display apparatus of the fourth aspect to be described below, repeated descriptions of the display apparatuses according to the first to third aspects as described above may be omitted.

The display apparatus 1 according to the fourth aspect may include a plurality of first groups PUG1 spaced apart from each other.

One first group PUG1 may include a plurality of first panels PU1 sequentially arranged in the first direction and/or the second direction.

Figure 10:
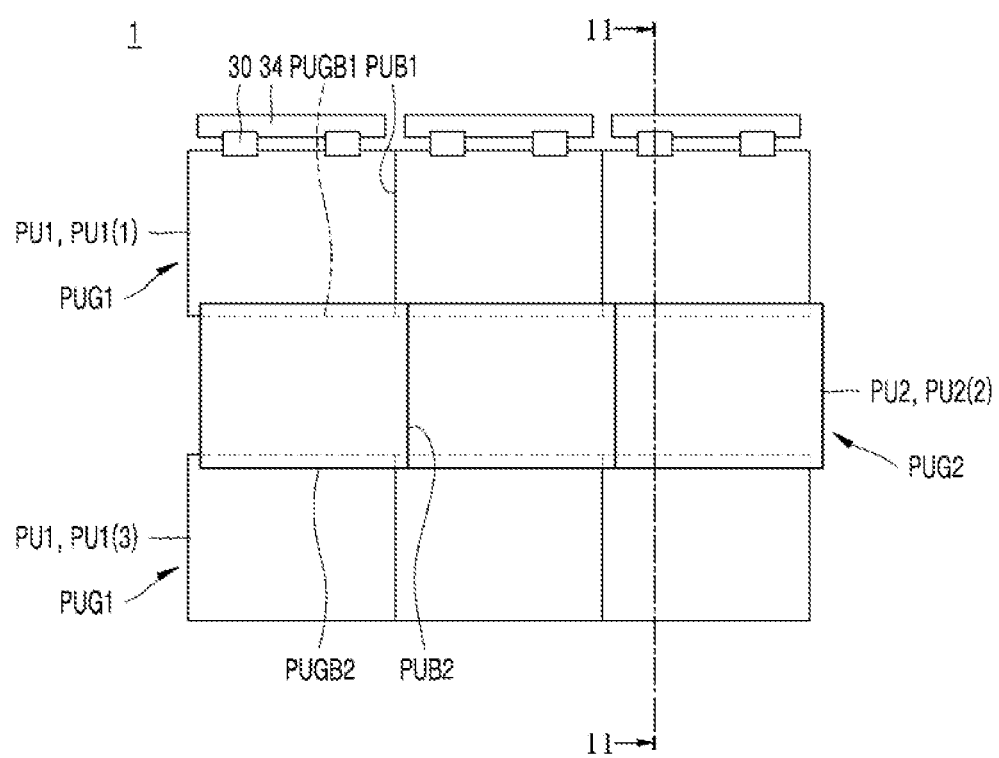
FIG. 10 is a plan view showing a stacked structure of a display apparatus according to a fourth aspect of the present disclosure.
Figure 11:
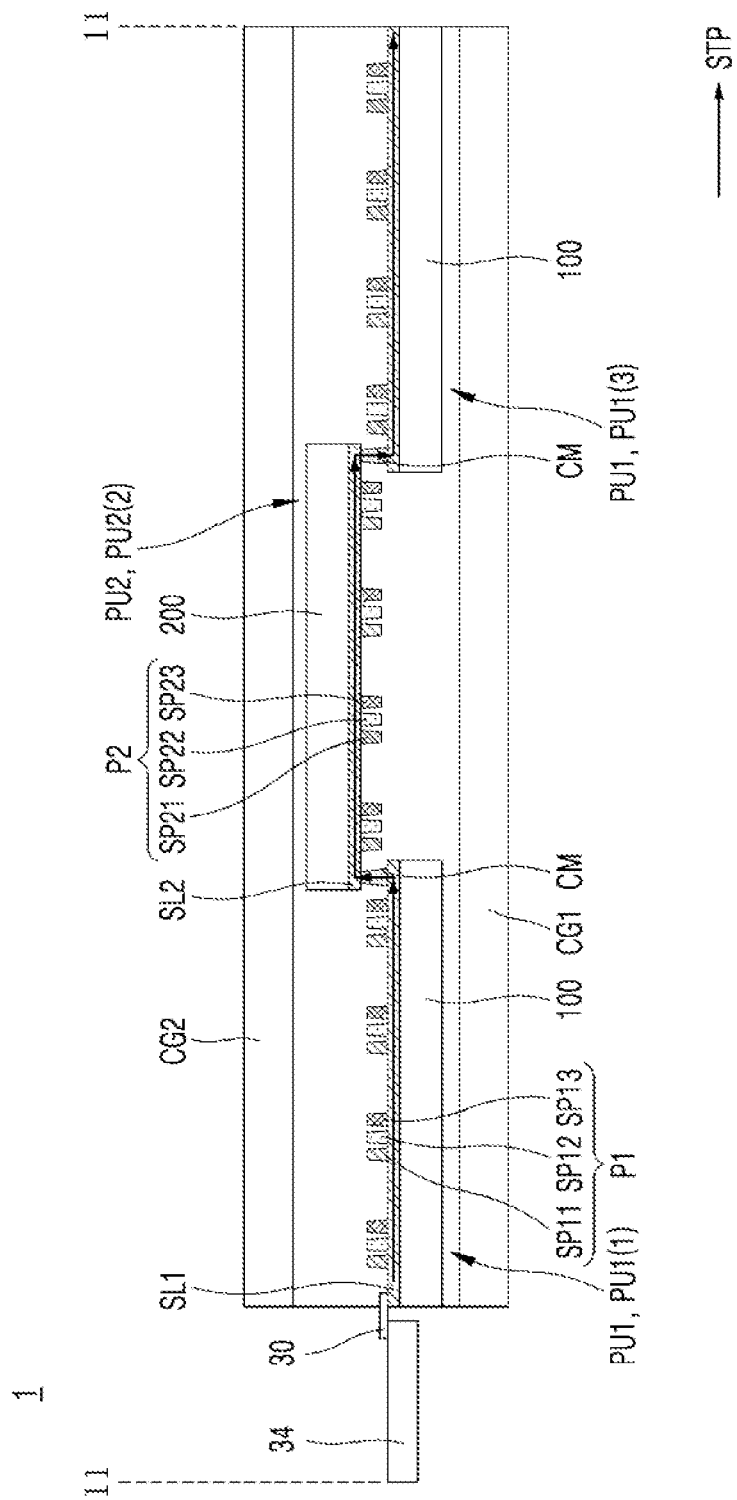
FIG. 11 is a cross-sectional view showing flow of a line signal of a display apparatus according to the fourth aspect of the present disclosure.

FIG. 10 illustrates one example in which the first panels PU1 are arranged in 2 rows and 3 columns. However, aspects of the present disclosure are not limited thereto.

For convenience of description, the plurality of first panels PU1 arranged in the first direction may be referred to as a first panel PU1(2n−1). In this case, n is a natural number.

Therefore, the first panels PU1 arranged in the first direction shown in FIG. 10 may include a first panel PU1(1), and a first panel PU1(3).

Each of the plurality of first panels PU1 may be a same single panel having one type or a same type.

Therefore, the plurality of first panels PU1 may be same panel having the same size and shape.

The first panel PU1 may be a first display panel.

Therefore, the first panel PU1 may include a plurality of first pixel parts P1 arranged on a first substrate 100, and a plurality of first signal lines SL1 that apply various line signals to the plurality of first pixel parts P1.

The circuit film 30 that transmits various line signals to the display apparatus 1 may be disposed on one side (or one portion) of the first panel PU1 to be electrically connected to the first panel PU1.

The circuit film 30 may be electrically connected to the first signal line SL1 of the first panel PU1.

One or more printed circuit boards 34 may be electrically connected to the other side (or the other portion) of the circuit film 30 opposite to one side of the circuit film 30 connected to the first panel PU1.

Various other voltages and signals may be transmitted through the circuit film 30 to the first signal line SL1 of the first panel PU1.

In this way, various voltages and signals transmitted through the circuit film 30 may be supplied to each first pixel part P1 through the first signal line SL1.

A distance between adjacent ones of the plurality of first groups PUG1 spaced apart from each other may be smaller than a width of one first panel PU1.

One second group PUG2 may include a plurality of second panels PU2 sequentially arranged in the first direction and/or the second direction.

FIG. 10 illustrates one example in which the second panels PU2 are arranged in 1 row and 3 columns. However, aspects of the present disclosure are not limited thereto.

For convenience of description, the plurality of second panels PU2 arranged in the first direction may be referred to as a second panel PU2(2n). In this case, n is a natural number.

Therefore, the second panels PU2 arranged in the first direction shown in FIG. 10 may include a second panel PU2(2).

Each of the plurality of second panels PU2 may be a same single panel having one type or a same type.

Therefore, the plurality of second panels PU2 may be same panel having the same size and shape.

The second panel PU2 may be a second display panel.

Therefore, the second panel PU2 may include a plurality of second pixel parts P2 arranged on a second substrate 200, and a plurality of second signal lines SL2 that apply various line signals to the plurality of second pixel parts P2.

In this case, the second panel PU2 and the first panel PU1 may be the same panel having the same size and shape.

In other words, each of the first panel PU1 and the second panel PU2 may be a single panel having one type or a same type.

However, in a plan view of the display apparatus, a position of the first panel PU1 and a position of the second panel PU2 may be different from each other, and the first panel PU1 and the second panel PU2 may be one display panel.

The second group PUG2 may be stacked on the first group PUG1 so that the second group (or second panel unit group) PUG2 is not aligned with the first group PUG1 in the plan view.

For example, a first group boundary part PUGB1 and a second group boundary part PUGB2 extending along the second direction may be disposed so as not to be aligned with each other.

For example, the first group boundary part PUGB1 may be disposed along approximately a periphery of the second group PUG2. The second group boundary part PUGB2 may be disposed along approximately a periphery of the first group PUG1.

Furthermore, the first group PUG1 and the second group PUG2 may be disposed such that the boundary part PUB1 between adjacent ones of the plurality of first panels PU1 arranged in the second direction, and the boundary part PUB2 between adjacent ones of the plurality of second panels PU2 are not aligned with each other in the plan view.

For example, the boundary part PUB1 between adjacent ones of the plurality of first panels PU1 arranged along the second direction may be disposed along approximately a periphery of the second panel PU2

Furthermore, the boundary part PUB2 between adjacent ones of the plurality of second panels PU2 arranged along the second direction may be disposed along approximately a periphery of the first panel PU1.

That is, the periphery of the second group PUG2 may be disposed to overlap with the periphery of each of a plurality of first groups PUG1 adjacent thereto. Neighboring ones of the plurality of first groups PUG1 may be electrically connected to each other by the second group PUG2.

Under this structure, the total number of the first panels PU1 disposed in the first group PUG1 may be equal to the total number of the second panels PU2 disposed in the second group PUG2, while the total number of the first panels PU1 in the display apparatus 1 may be greater than the total number of the second panels PU2 of the display apparatus 1.

Accordingly, in the plan view, the first panels PU1 and the second panels PU2 may be arranged in a zigzag manner along the first direction and/or the second direction, such that the first panels PU1 and the second panels PU2 stacked in a vertical direction (or up and down direction) may be arranged alternately with each other in the plan view.

For example, the first panel PU1(1) to which the circuit film 30 is connected, the second panel PU2(2), and the first panel PU1(3) may be arranged sequentially and alternately with each other in this order in a direction away from the circuit film 30.

The first group PUG1 and the second group PUG2 may be electrically connected to each other by the plurality of contact members CM disposed between the first panel PU1 and the second panel PU2.

The contact member CM may be disposed in an overlapping area between a periphery of the first group PUG1 and a periphery of the second group PUG2.

For example, the first signal line SL1 of the first panel PU1 may be electrically connected to the second signal line SL2 of the second panel PU2 by the contact member CM.

For example, the line signal STP may pass through the first panel PU1(1), the second panel PU2(2), and the first panel PU1(3) in an alternate manner.

Therefore, the line signal STP may pass from the first panel PU1(1) to which the circuit film 30 is connected, to the second panels PU2(2) and the first panels PU1(3).

Figure 12:
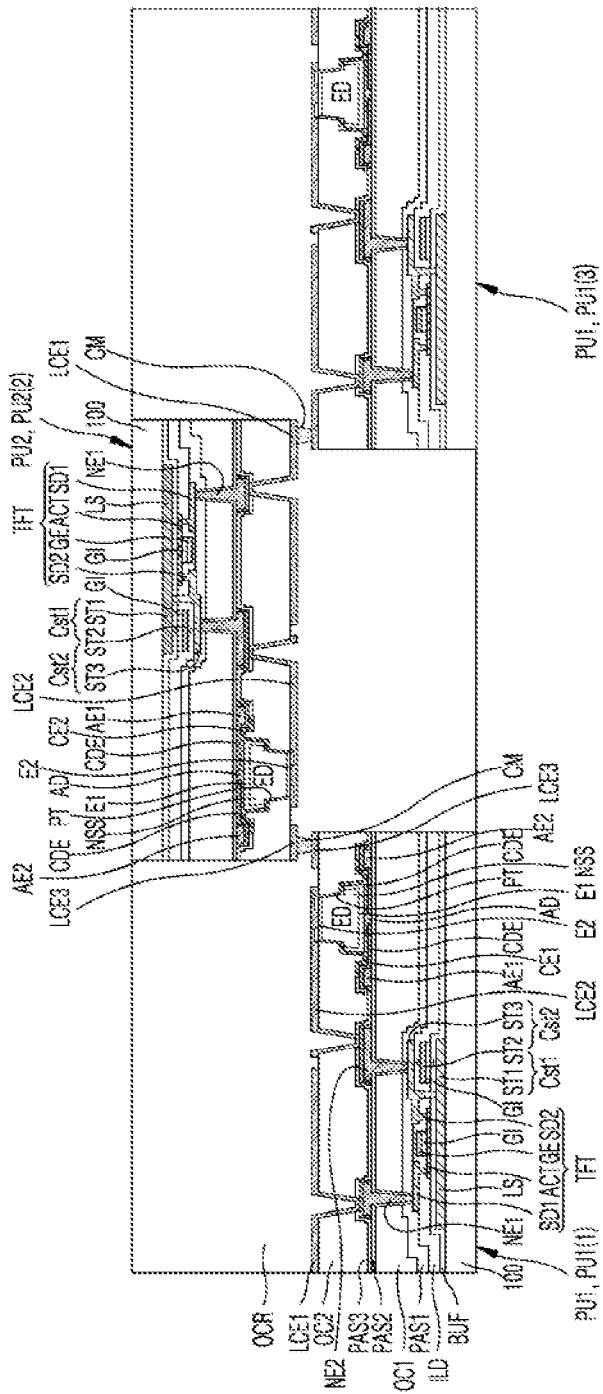
FIG. 12 is a detailed cross-sectional view of the display apparatus according to the fourth aspect of the present disclosure.

Referring to FIG. 12, the first panels PU1 and the second panels PU2 may be electrically connected to each other by the contact member CM disposed between the third line connection electrode LCE3 and the third line connection electrode LCE3 thereof, and the contact member CM disposed between the first line connection electrodes LCE1 and the first line connection electrodes LCE1 thereof. The line signal STP may flow through the first panels PU1 and the second panels PU2 alternately in the vertical direction (or up and down direction).

For example, the contact member CM may be disposed between the third line connection electrode LCE3 of the first panel PU1(1) and the third line connection electrode LCE3 of the second panel PU2(2) to allow the line signal STP to pass from the first panel PU1(1) to the second panel PU2(2).

Next, the line signal STP having flowed to the second panel PU2(2) may flow to the first panel PU1(3) by the contact member CM disposed between the first line connection electrode LCE1 of the second panel PU2(2) and the first line connection electrode LCE1 of the first panel PU1(3).

In the display apparatus 1 according to the fourth aspect having a relatively small number of display panels compared to the display apparatus 1 according to other aspects, the line signal may be applied to adjacent display panels to display an image.

Figure 14:
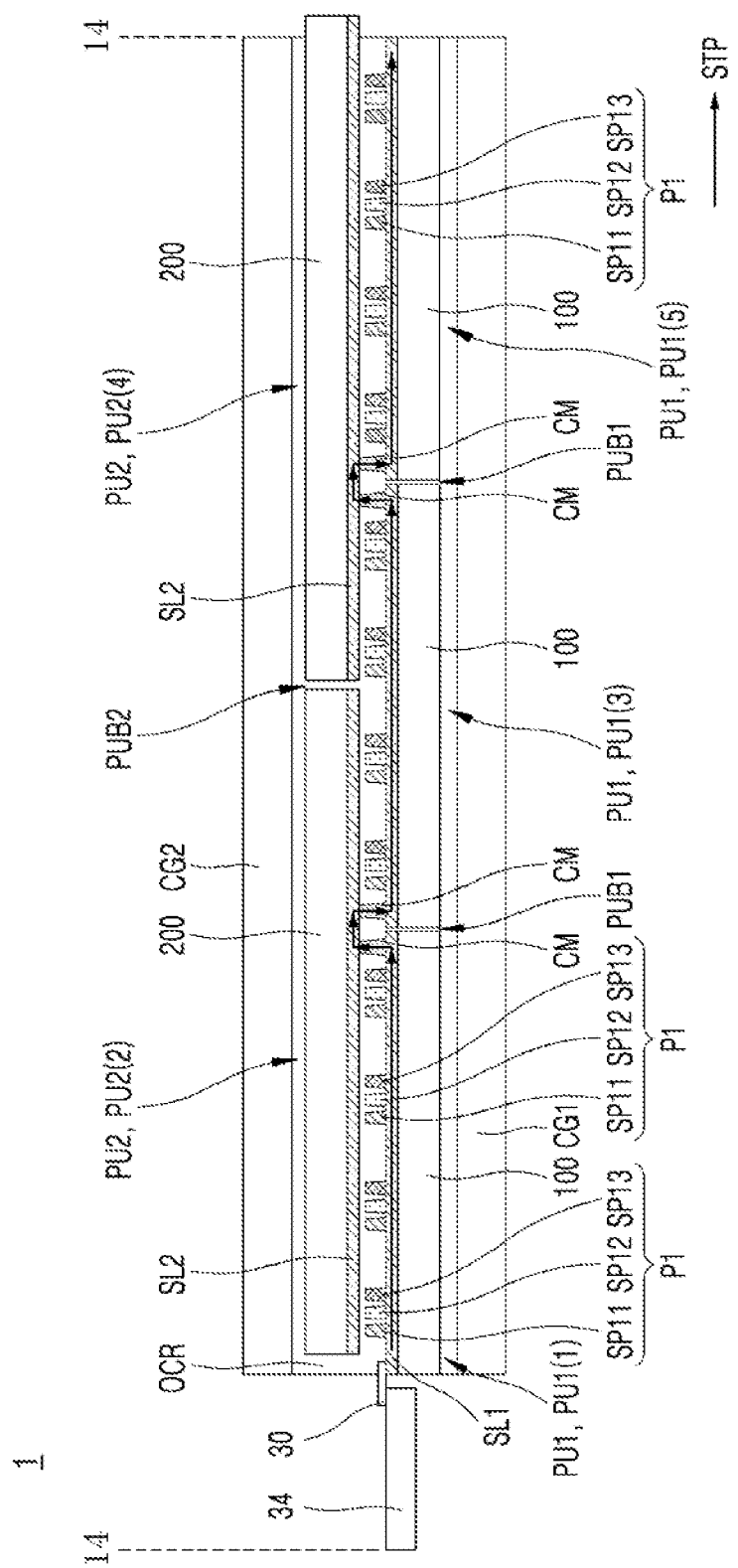
FIG. 14 is a cross-sectional view showing flow of a line signal of a display apparatus according to the fifth aspect of the present disclosure.
Figure 15:
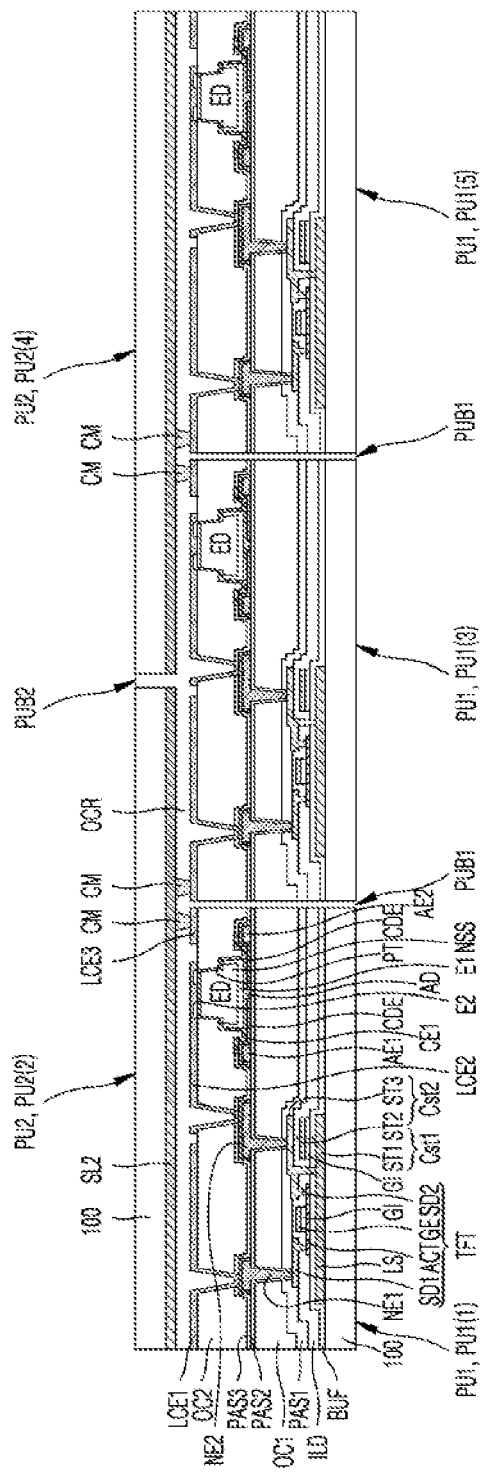
FIG. 15 is a detailed cross-sectional view of the display apparatus according to the fifth aspect of the present disclosure.

Hereinafter, a display apparatus according to a fifth aspect of the present disclosure will be described in detail with referring to FIG. 13 to FIG. 15.

As for the display apparatus of the fifth aspect to be described below, repeated descriptions of the display apparatus according to the first to fourth aspects as described above may be omitted.

One first group PUG1 may include a plurality of first panels PU1 sequentially arranged in the first direction and/or the second direction.

Figure 13:
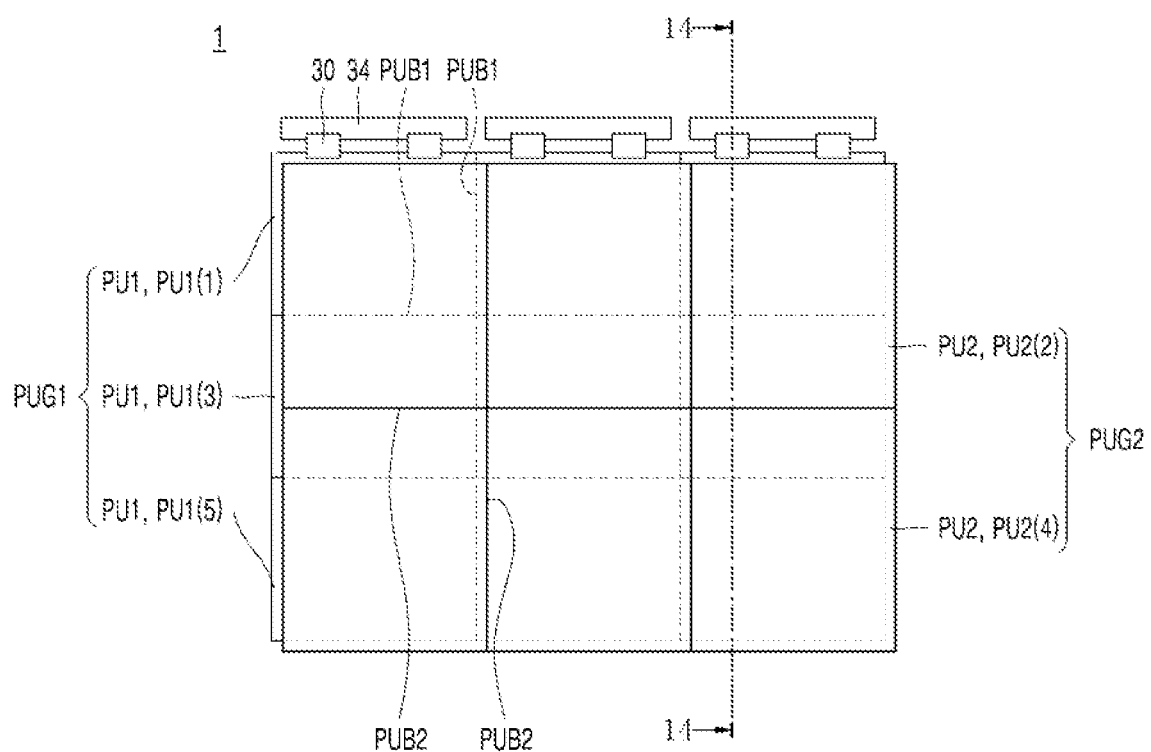
FIG. 13 is a plan view showing a stacked structure of a display apparatus according to a fifth aspect of the present disclosure.

FIG. 13 illustrates one example in which the first panels PU1 are arranged in 3 rows and 3 columns. However, aspects of the present disclosure are not limited thereto.

For convenience of description, the plurality of first panels PU1 arranged in the first direction may be referred to as a first panel PU1($2n-1$). In this case, n is a natural number.

Therefore, the first panels PU1 arranged in the first direction shown in FIG. 13 may include a first panel PU1(1), a first panel PU1(3), and a first panel PU1(5).

Each of the plurality of first panels PU1 may be a same single panel having one type or a same type.

Therefore, the plurality of first panels PU1 may be a panel having the same size and shape.

The first panel PU1 may be a display panel.

Therefore, the first panel PU1 may include a plurality of first pixel parts P1 arranged on a first substrate 100, and a plurality of first signal lines SL1 that apply various line signals to the plurality of first pixel parts P1.

The circuit film 30 that transmits various line signals to the display apparatus 1 may be disposed on one side (or one portion) of the first panel PU1 to be electrically connected to the first panel PU1.

The circuit film 30 may be electrically connected to the first signal line SL1 of the first panel PU1.

Various voltages and signals may be transmitted to the first signal line SL1 of the first panel PU1 via the circuit film 30.

In this way, the various voltages and signals transmitted from the circuit film 30 may be supplied to each of the first pixel parts P1 through the first signal line SL1.

One second group PUG2 may include a plurality of second panels PU2 sequentially arranged in the first direction and/or the second direction.

FIG. 13 illustrates one example in which the second panels PU2 are arranged in 2 rows and 3 columns. However, aspects of the present disclosure are not limited thereto.

For convenience of description, the plurality of second panels PU2 arranged in the first direction may be referred to as a second panel PU2($2n$). In this case, n is a natural number.

Therefore, the second panels PU2 arranged in the first direction shown in FIG. 13 may include a second panel PU2(2), and a second panel PU2(4).

Each of the plurality of second panels PU2 may be a same single panel having one type or a same type.

Therefore, the plurality of second panels PU2 may be a same panel having the same size and shape.

The second panel PU2 may be a line panel.

Therefore, the second panel PU2 may include a plurality of second signal lines SL2 on the second substrate 200. However, the pixel is not disposed in the second panel PU2.

In this case, a size of each of the plurality of second panels U2 may be larger than a size of each of the first panels PU1.

The second group PUG2 may be stacked on the first group PUG1 so that the second group PUG2 is not aligned with the first group PUG1 in the plan view.

For example, the first group PUG1 and the second group PUG2 are stacked on each other such that a boundary part PUB1 between adjacent ones of the plurality of first panels PU1 and a boundary part PUB2 between adjacent ones of the plurality of second panels PU2 are not aligned with each other in the plan view.

For example, the boundary part PUB1 between adjacent ones of the plurality of first panels PU1 arranged along the first direction may be disposed along approximately a center area of the second panel PU2.

Furthermore, the boundary part PUB2 between adjacent ones of the plurality of second panels PU2 arranged along the first direction may be disposed along approximately a center area of the first panel PU1.

Therefore, with respect to the first direction, one first panel PU1 may be disposed to overlap an approximately half area of one second panel PU2.

For example, the boundary part PUB1 between adjacent ones of the plurality of first panels PU1 arranged along the second direction may be disposed along approximately a periphery part of the second panel PU2.

Furthermore, the boundary part PUB2 between adjacent ones of the plurality of second panels PU2 arranged along the second direction may be disposed along approximately a periphery part of the first panel PU1.

In this structure, a total number of the first panels PU1 disposed in the first group PUG1 may be greater than a total number of the second panels PU2 disposed in the second group PUG2.

Accordingly, in the plan view, the first panels PU1 and the second panels PU2 may be arranged in a zigzag manner along the first direction and/or the second direction, such that the first panels PU1 and the second panels PU2 stacked in a vertical direction (or up and down direction) may be arranged alternately with each other in the plan view.

For example, the first panel PU1(1) to which the circuit film 30 is connected, the second panel PU2(2), the first panel PU1(3), the second panel PU2(4), and the first panel PU1(5) may be arranged sequentially and alternately with each other in this order in a direction away from the circuit film 30.

The first group PUG1 and the second group PUG2 may be electrically connected to each other by one or more contact members CM disposed between the first panel PU1 and the second panel PU2.

For example, the first signal line SL1 of the first panel PU1 may be electrically connected to the second signal line SL2 of the second PU2 by the contact member CM.

The plurality of contact members CM may be arranged according to a flow direction of the line signal STP, and the line signal STP may pass through the first panels PU1 and the second panels PU2 by the plurality of contact members CM in an alternate manner.

The flow directions of the line signal in neighboring ones of the plurality of contact members CM may be opposite to each other.

In this case, one first panel PU1 may be electrically connected to one second panel PU2 by one contact member CM.

For example, the line signal STP transmitted from the circuit film 30 may flow sequentially through the first panel PU1(1), the second panel PU2(2), the first panel PU1(3), the second panel PU2(4), and the first panel PU1(5) in this order.

Therefore, the first group PUG1 and the second group PUG2 may be electrically connected to each other so that the line signal STP alternately passes through the first panels PU1 and the second panels PU2.

The first group PUG1 and the second group PUG2 may be bonded (or attached) to each other by the optical resin layer OCR disposed between the first group PUG1 and the second group PUG2.

The first cover part CG1 and the second cover part CG2 may be additionally disposed on a portion of the first group (or first panel unit group) PUG1 and a portion of the second group (or second panel unit group) PUG2, respectively. For example, the first cover part CG1 and the second cover part CG2 may be additionally disposed on a lower surface of the first panel group PUG1 and an upper surface of the second panel group PUG2, respectively Referring to FIG. 15, the first panel PU1 and the second panel PU2 are electrically connected to each other by the contact member CM disposed between the third line connection electrode LCE3 of the first panel PU1 and the second signal line SL2 of the second panel PU2, and the contact member CM disposed between the first line connection electrode LCE1 of the first panel PU1 and the second signal line SL2 of the second panel PU2. Thus, the line signal STP may pass through the first panel PU1 and the second panel PU2 alternately in the vertical direction (or up and down direction).

For example, the contact member CM may be disposed between the third line connection electrode LCE3 of the first panel PU1(1) and the second signal line SL2 of the second panel PU2(2). Thus, the line signal STP may pass from the first panel PU1(1) to the second panel PU2(2).

For example, the contact member CM may be disposed between the first line connection electrode LCE1 of the first panel PU1(3) and the second signal line SL2 of the second panel PU2(2). Thus, the line signal STP may pass from the second panel PU2(2) to the first panel PU1(3).

Next, the line signal STP flow to the first panel PU1(3) may flow to the second panel PU2(4) by the contact member CM disposed between the second signal line SL2 of the second panel PU2(4) and the third line connection electrode LCE3 of the first panel PU1(3).

Then, the contact member CM may be disposed between the first line connection electrode LCE1 of the first panel PU1(5) and the second signal line SL2 of the second panel PU2(4), and thus the line signal STP may pass from the second panel PU2(4) to the first panel PU1(5).

In this way, in the display apparatus 1 according to an aspect of the present disclosure, the first panel PU1 is embodied as the display panel unit and the second panel PU2 is embodied as the line panel. Thus, the plurality of line panels may be arranged in a tiling scheme. Thus, display apparatuses of various sizes may be implemented without limitation on the production of a large line panel.

Hereinafter, a display apparatus according to a sixth aspect of the present disclosure will be described in detail with referring to FIG. 16 to FIG. 17.

As for the display apparatus of the sixth aspect to be described below, repeated descriptions of the display apparatuses according to the first to fifth aspects as described above may be omitted.

One first group PUG1 may include a plurality of first panels PU1 sequentially arranged in the first direction and/or the second direction.

Figure 16:
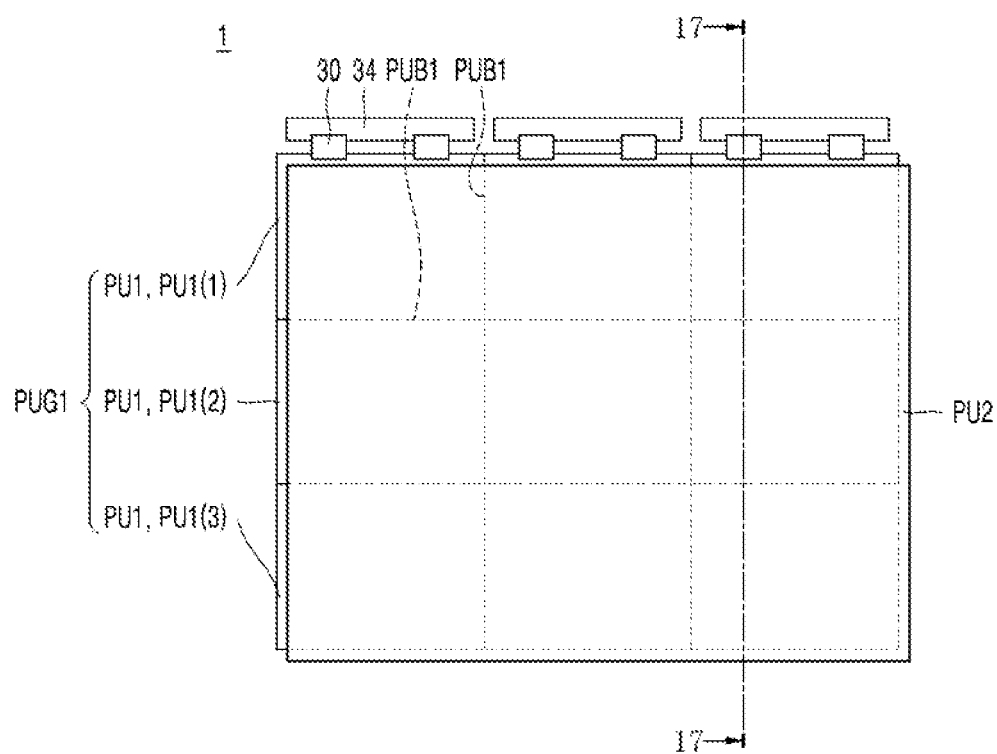
FIG. 16 is a plan view showing a stacked structure of a display apparatus according to a sixth aspect of the present disclosure.
Figure 17:
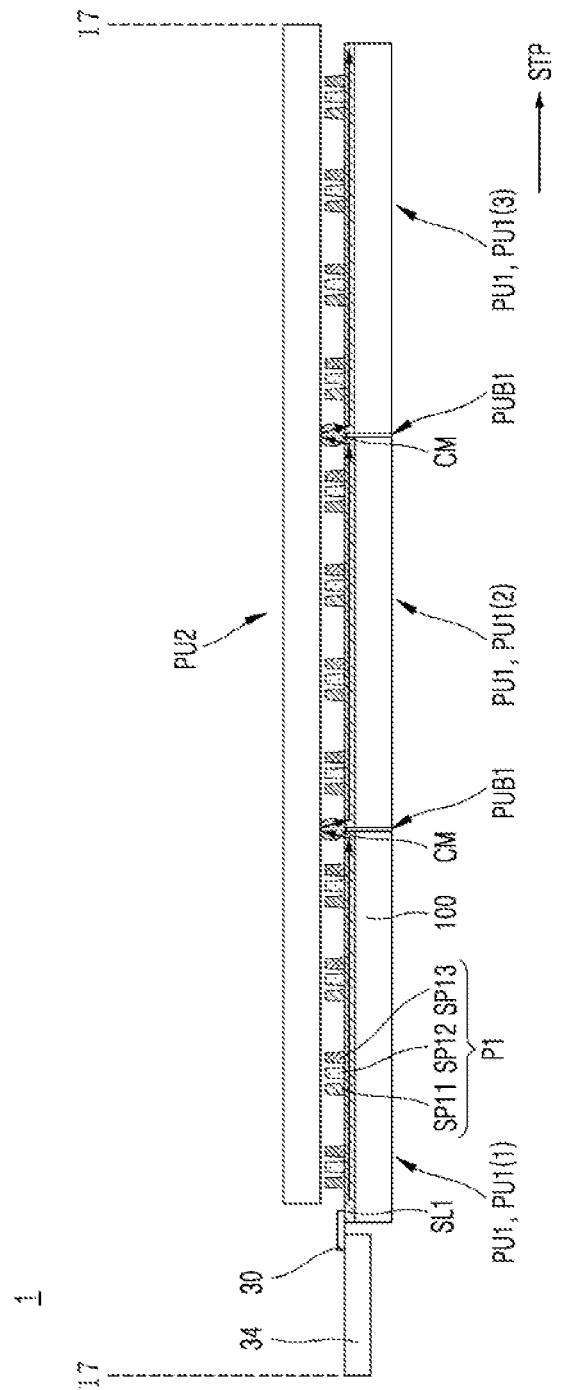
FIG. 17 is a cross-sectional view showing flow of a line signal of a display apparatus according to the sixth aspect of the present disclosure.

FIG. 16 illustrates one example in which the first panels PU1 are arranged in 3 rows and 3 columns. However, aspects of the present disclosure are not limited thereto.

For convenience of description, the plurality of first panels PU1 arranged in the first direction may be referred to as a first panel PU1(n). In this case, n is a natural number.

Therefore, the first panels PU1 arranged in the first direction shown in FIG. 16 may include a first panel PU1(1), a first panel PU1(2), and a first panel PU1(3).

Each of the plurality of first panels PU1 may be a same single panel having one type or a same type.

Therefore, the plurality of first panels PU1 may be same panel having the same size and shape.

The first panel PU1 may be a display panel.

Therefore, the first panel PU1 may include a plurality of first pixel parts P1 arranged on a first substrate 100, and a plurality of first signal lines SL1 that apply various line signals to the plurality of first pixel parts P1.

The circuit film 30 that transmits various line signals to the display apparatus 1 may be disposed on one side (or one portion) of the first panel PU1 to be electrically connected to the first panel PU1.

The circuit film 30 may be electrically connected to the first signal line SL1 of the first panel PU1.

Various voltages and signals may be transmitted to the first signal line SL1 of the first panel PU1 via the circuit film 30.

In this way, the various voltages and signals transmitted from the circuit film 30 may be supplied to each of the first pixel parts P1 through the first signal line SL1.

A second panel PU2 may be stacked on the first group PUG1.

The second panel PU2 may be formed as a single panel to cover an entirety of an upper surface of the first group PUG1.

The second panel PU2 may be embodied as a glass substrate, and thus may be free of not only the pixel part but also the signal line.

The contact member CM may be disposed between the first group PUG1 and the second panel PU2 to overlap the boundary part PUB1 between adjacent ones of the plurality of first panels PU1.

Two of the plurality of first panels PU1 adjacent to each other may be electrically connected to each other by the contact member CM to pass the line signal STP to pass through the two of the plurality of first panels PU1 adjacent to each other.

For example, the contact member CM may be compressed or pressed by the second panel PU2 to be disposed to overlap periphery parts of the adjacent two of the plurality of first panels PU1.

In other words, one contact member CM may be compressed by the second panel PU2, so that neighboring one of the plurality of first panels PU1 may be electrically connected to each other by the compressed contact member CM.

In the sixth aspect of the present disclosure, the contact member CM may play a role of a conductive sealing member.

Therefore, the line signal STP transmitted from the circuit film 30 may sequentially transmit to the first panel PU1(1) and then to one contact member CM and then to the first panel PU1(2), and then to the contact member CM and then to the first panel PU1(3).

In this way, in the display apparatus 1 according to an aspect of the present disclosure, the display panels may be electrically connected to each other without a separate line substrate, such that the display apparatus 1 displays an image.

A display apparatus according to various aspects of the present disclosure may be described as follows.

A display apparatus according to various aspects of the present disclosure may comprise a first group including a plurality of first panels, a second group stacked on the first group including a plurality of second panels; and a circuit film disposed on one portion of the first group and configured to apply a line signal to the first group. The first group and the second group may be stacked on each other to be not aligned with each other. The first group and the second group maybe electrically connected to each other so that the line signal passes through the first group and the second group.

According to various aspects of the present disclosure, the first group and the second group may be stacked on each other such that a boundary part between adjacent ones of the plurality of first panels and a boundary part between adjacent ones of the plurality of second panels are not aligned with each other.

According to various aspects of the present disclosure, the plurality of first panels may be arranged in a first direction and/or a second direction intersecting the first direction. The plurality of second panels may be arranged in the first direction and/or the second direction. The first panels and the second panels may be arranged in a zigzag manner along the first direction and/or the second direction.

According to various aspects of the present disclosure, the line signal may pass through the first panels and the second panels by a plurality of contact members in an alternate manner.

According to various aspects of the present disclosure, the line signal applied to the first panel may flow from the first panel to the second panel by a contact member disposed between a line connection electrode of the first panel and a line connection electrode of the second panel which are adjacent and disposed to face to each other.

According to various aspects of the present disclosure, the display apparatus may further comprise a first cover part and a second cover part disposed at a lower surface of the first group and an upper surface of the second group, respectively.

According to various aspects of the present disclosure, the first group and the second group may be attached to each other by a resin layer disposed between the first group and the second group.

A display apparatus according to various aspects of the present disclosure may comprise a first group including at least one first panel, a second group including at least one second panel, the second group being stacked on the first group, and a circuit film disposed on one portion of the first group and configured to apply a line signal to the first group. The first group and the second group may be electrically connected to each other so that the line signal alternately passes through the first panel and the second panel.

According to various aspects of the present disclosure, the first panel may be a first display panel including a plurality of first pixels. The second panel may be a second display panel including a plurality of second pixels.

According to various aspects of the present disclosure, the first panel and the second panel may have a same pixel arrangement structure.

According to various aspects of the present disclosure, the first panel may be a first display panel including a plurality of pixels. The second panel may be a second line panel including a plurality of signal lines.

According to various aspects of the present disclosure, the at least one first panel may include a plurality of first panels, and the plurality of first panels may be arranged in a tiling manner with each other. The at least one second panel may include a plurality of second panels, and the plurality of second panels may be arranged in a tiling manner with each other.

According to various aspects of the present disclosure, the at least one first panel may include a plurality of first panels. The at least one second panel may include a plurality of second panels. The first group and the second group may be stacked on each other such that a boundary part between adjacent ones of the plurality of first panels and a boundary part between adjacent ones of the plurality of second panels do not align with each other.

According to various aspects of the present disclosure, the first group and the second group may be electrically connected to each other by at least one contact member disposed between the at least one first panel and the at least one second panel.

According to various aspects of the present disclosure, one first panel may be electrically connected to one second panel by one contact member.

According to various aspects of the present disclosure, the at least one contact member may include a plurality of contact members arranged along a flow direction of the line signal. The line signal may pass through the at least one first panel and the at least one second panel alternately by the plurality of contact members. Flow directions of the line signal in adjacent ones of the plurality of contact members may be opposite to each other.

According to various aspects of the present disclosure, the at least one contact member may include a plurality of contact members. The plurality of contact members may include a plurality of first contact members and a plurality of second contact members. One first panel may be electrically connected to two adjacent second panels by one first contact member and one second contact member.

According to various aspects of the present disclosure, the at least one contact member may include a plurality of contact members arranged along a flow direction of the line signal. The plurality of contact members may include a plurality of first contact members and a plurality of second contact members. The line signal may alternately pass through the at least one first panel and the at least one second panel by the plurality of first contact members. The line signal may flow between the first panel and the second panel having a largest area overlapping each other in a vertical direction by the plurality of second contact members.

According to various aspects of the present disclosure, the plurality of first pixel parts and the plurality of second pixel parts may be disposed so as not to overlap each other in a vertical direction.

According to various aspects of the present disclosure, the plurality of first pixel parts and the plurality of second pixel parts may be disposed such that at least partial areas thereof overlap each other in a vertical direction.

According to various aspects of the present disclosure, a total number of the at least one first panel disposed in the first group may be greater than a total number of the at least one second panel disposed in the second group.

According to various aspects of the present disclosure, a total number of the at least one first panel disposed in the first group may be equal to a total number of the at least one second panel disposed in the second group.

According to various aspects of the present disclosure, each of the first display panel and the second display panel may include a plurality of light emitting elements. An interval between the outermost light-emitting element of one display panel and the outermost light-emitting element of another display panel adjacent thereto may be equal to an interval between adjacent light-emitting elements in one display panel.

According to various aspects of the present disclosure, the line signal applied to the first panel may flow from the first panel to the second panel by a contact member disposed between a line connection electrode of the first panel and a line connection electrode of the second panel which are adjacent and disposed to face to each other.

A display apparatus according to various aspects of the present disclosure may comprise a plurality of first groups spaced apart from each other, the plurality of first groups including at least one first panel, a second group stacked on the first groups, the second group including at least one second panel, and a circuit film disposed on one portion of one of the first groups and configured to apply a line signal to the one of the first groups. Adjacent ones of the plurality of first groups may be electrically connected to each other via the second group so that the line signal alternately passes through the at least one first panel and the at least one second panel.

According to various aspects of the present disclosure, both opposing peripheries of the second group may be disposed to respectively overlap peripheries of the adjacent ones of the plurality of first groups.

According to various aspects of the present disclosure, a plurality of contact members electrically connecting the at least one first panel and the at least one second panel to each other. The plurality of contact members may be disposed at an overlapping area between the periphery of the first group and the periphery of the second group.

According to various aspects of the present disclosure, the first panel may be a first display panel including a plurality of first pixel parts. The second panel may be a second display panel including a plurality of second pixel parts. The first panel and the second panel may have a same pixel arrangement structure.

According to various aspects of the present disclosure, the at least one first panel may include a plurality of first panels and the plurality of first panels may be arranged in a tiling manner with each other. The at least one second panel may include a plurality of second panels and the plurality of second panels may be arranged in a tiling manner with each other.

According to various aspects of the present disclosure, each of the first display panel and the second display panel may include a plurality of light emitting elements. An interval between the outermost light-emitting element of one display panel and the outermost light-emitting element of another display panel adjacent thereto may be equal to an interval between adjacent light-emitting elements in one display panel.

A display apparatus according to various aspects of the present disclosure may comprise a first group including a plurality of first panels, a second panel stacked on the first group, a circuit film disposed at one portion of the first group and configured to apply a line signal to the first group, and a contact member disposed between the first group and the second panel and disposed to overlap a boundary part between adjacent ones of the plurality of first panels. The adjacent ones of the plurality of first panels may be electrically connected to each other by the contact member such that the line signal passes through the adjacent ones of the plurality of first panels.

According to various aspects of the present disclosure, the contact member may be pressed by the second panel to be disposed to overlap peripheries of the adjacent ones of the plurality of first panels.

According to various aspects of the present disclosure, the second panel may be embodied as a single panel.

It will be apparent to those skilled in the art that various modifications and variations may be made in the display apparatus of the present disclosure without departing from the technical idea or scope of the present disclosure. Thus, it is intended that the present disclosure cover the modifications and variations of this disclosure provided that within the scope of the claims and their equivalents.

What is claimed is:

1. A display apparatus, comprising:
a first group including a plurality of first panels, each of the first panels comprising a plurality of micro-LEDs;
a second group including a plurality of second panels, each of the second panels comprising a plurality of micro-LEDs, stacked on the first group; and
a circuit film disposed at one portion of the first group and configured to apply a line signal to the first group,
wherein the first group and the second group are stacked on each other to be not aligned with each other, and
wherein the first group and the second group are electrically connected to each other so that the line signal passes through the first group and the second group.

2. The display apparatus of claim 1, wherein the first group and the second group are stacked on each other such that a boundary part between adjacent ones of the plurality of first panels and a boundary part between adjacent ones of the plurality of second panels do not align with each other.

3. The display apparatus of claim 1, wherein the plurality of first panels are arranged in a first direction and/or a second direction intersecting the first direction,
wherein the plurality of second panels are arranged in the first direction and/or the second direction, and
wherein the first panels and the second panels are arranged in a zigzag manner along the first direction and/or the second direction.

4. The display apparatus of claim 1, wherein the line signal passes through the first panels and the second panels by a plurality of contact members in an alternate manner.

5. The display apparatus of claim 1, further comprising a first cover part and a second cover part disposed at a lower surface of the first group and an upper surface of the second group, respectively.

6. The display apparatus of claim 1, wherein the first group and the second group are attached to each other by a resin layer disposed between the first group and the second group.

7. A display apparatus, comprising:
a first group including at least one first panel, each first panel comprising a plurality of micro-LEDs;
a second group including at least one second panel, each second panel comprising a plurality of micro-LEDs, on the first group; and
a circuit film disposed at one portion of the first group and configured to apply a line signal to the first group,
wherein the first group and the second group are electrically connected to each other so that the line signal alternately passes through the first panel and the second panel.

8. The display apparatus of claim 7, wherein the first panel is a first display panel including a plurality of first pixel parts, and
wherein the second panel is a second display panel including a plurality of second pixel parts.

9. The display apparatus of claim 8, wherein the first panel and the second panel have a same pixel arrangement structure.

10. The display apparatus of claim 7, wherein the first panel is a first display panel including a plurality of pixel part, and
wherein the second panel is a second line panel including a plurality of signal lines.

11. The display apparatus of claim 7, wherein the at least one first panel includes a plurality of first panels, and the plurality of first panels are arranged in a tiling manner with each other, and
wherein the at least one second panel includes a plurality of second panels, and the plurality of second panels are arranged in a tiling manner with each other.

12. The display apparatus of claim 7, wherein the at least one first panel includes a plurality of first panels, and the at least one second panel includes a plurality of second panels, and
wherein the first group and the second group are stacked each other such that a boundary part between adjacent ones of the plurality of first panels and a boundary part between adjacent ones of the plurality of second panels do not align with each other.

13. The display apparatus of claim 7, wherein the first group and the second group are electrically connected to each other by at least one contact member between the at least one first panel and the at least one second panel.

14. The display apparatus of claim 13, wherein one first panel is electrically connected to one second panel by one contact member.

15. The display apparatus of claim 13, wherein the at least one contact member includes a plurality of contact members arranged along a flow direction of the line signal,
wherein the line signal passes through the at least one first panel and the at least one second panel alternately by the plurality of contact members, and
wherein flow directions of the line signal in adjacent ones of the plurality of contact members are opposite to each other.

16. The display apparatus of claim 13, wherein the at least one contact member includes a plurality of contact members,
wherein the plurality of contact members include a plurality of first contact members and a plurality of second contact members, and
wherein one first panel is electrically connected to two adjacent second panels by one first contact member and one second contact member.

17. The display apparatus of claim 13, wherein the at least one contact member includes a plurality of contact members arranged along a flow direction of the line signal,
wherein the plurality of contact members include a plurality of first contact members and a plurality of second contact members,
wherein the line signal alternately passes through the at least one first panel and the at least one second panel by the plurality of first contact members, and
wherein the line signal flows between the first panel and the second panel having a largest size overlapping each other in a vertical direction by the plurality of second contact members.

18. The display apparatus of claim 8, wherein the plurality of first pixel parts and the plurality of second pixel parts are disposed so as not to overlap each other in a vertical direction.

19. The display apparatus of claim 8, wherein the plurality of first pixel parts and the plurality of second pixel parts are disposed such that at least partial areas thereof overlap each other in a vertical direction.

20. The display apparatus of claim 8, wherein a total number of the at least one first panel disposed in the first group is greater than a total number of the at least one second panel disposed in the second group.

21. The display apparatus of claim 8, wherein a total number of the at least one first panel disposed in the first group is equal to a total number of the at least one second panel disposed in the second group.

22. The display apparatus of claim 8, wherein each of the first display panel and the second display panel includes a plurality of light emitting elements, and
wherein an interval between the outermost light-emitting element of one display panel and the outermost light-emitting element of another display panel adjacent thereto is equal to an interval between adjacent light-emitting elements in one display panel.

23. A display apparatus, comprising:
a plurality of first groups spaced apart from each other, the plurality of first groups including at least one first panel, each first panel comprising a plurality of micro-LEDs;
a second group stacked on the first groups, the second group including at least one second panel, each second panel comprising a plurality of micro-LEDs; and
a circuit film disposed at one portion of one of the first groups and configured to apply a line signal to the one of the first groups,
wherein adjacent ones of the plurality of first groups are electrically connected to each other by the second group so that the line signal alternately passes through the at least one first panel and the at least one second panel.

24. The display apparatus of claim 23, wherein a periphery part of the second group is disposed to respectively overlap peripheries of the adjacent ones of the plurality of first groups.

25. The display apparatus of claim 24, wherein a plurality of contact members are electrically connected with the at least one first panel and the at least one second panel to each other, and
wherein the plurality of contact members are disposed at an overlapping area between the periphery of the first group and the periphery of the second group.

26. The display apparatus of claim 23, wherein the first panel is a first display panel including a plurality of first pixel parts,
wherein the second panel is a second display panel including a plurality of second pixel parts, and
wherein the first panel and the second panel have a same pixel arrangement structure.

27. The display apparatus of claim 23, wherein the one at least first panel includes a plurality of first panels and the plurality of first panels are arranged in a tiling manner with each other, and
wherein the at least one second panels includes a plurality of second panels and the plurality of second panels are arranged in a tiling manner with each other.

28. The display apparatus of claim 26, wherein each of the first display panel and the second display panel includes a plurality of light emitting elements, and
wherein an interval between the outermost light-emitting element of one display panel and the outermost light-emitting element of another display panel adjacent thereto is equal to an interval between adjacent light-emitting elements in one display panel.

29. A display apparatus, comprising:
a first group including a plurality of first panels, each of the first panels comprising a plurality of micro-LEDs;
a second panel stacked on the first group, the second panel comprising a plurality of micro-LEDs;
a circuit film disposed at one portion of the first group and configured to apply a line signal to the first group; and
a contact member between the first group and the second panel and disposed to overlap a boundary part between adjacent ones of the plurality of first panels,
wherein the adjacent ones of the plurality of first panels are electrically connected to each other by the contact member such that the line signal passes through the adjacent ones of the plurality of first panels.

30. The display apparatus of claim 29, wherein the contact member is pressed by the second panel to be disposed to overlap peripheries of the adjacent ones of the plurality of first panels.

31. The display apparatus of claim 29, wherein the second panel is embodied as a single panel.

* * * * *